US012578776B2

(12) United States Patent
Thubert et al.

(10) Patent No.: US 12,578,776 B2
(45) Date of Patent: Mar. 17, 2026

(54) SUSTAINABLE NETWORKING PLANE DE-ENERGIZATION

(71) Applicant: Cisco Technology, Inc., San Jose, CA (US)

(72) Inventors: Pascal Thubert, Roquefort les Pins (FR); Carlos Pignataro, Cary, NC (US); Ayan Banerjee, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 237 days.

(21) Appl. No.: 18/331,681

(22) Filed: Jun. 8, 2023

(65) Prior Publication Data

US 2024/0414102 A1 Dec. 12, 2024

(51) Int. Cl.
| | |
|---|---|
| *G06F 1/32* | (2019.01) |
| *G06F 1/3206* | (2019.01) |
| *G06F 1/3296* | (2019.01) |
| *H04L 41/08* | (2022.01) |
| *H04L 41/0813* | (2022.01) |

(52) U.S. Cl.
CPC .......... *G06F 1/3206* (2013.01); *G06F 1/3296* (2013.01); *H04L 41/0813* (2013.01)

(58) Field of Classification Search
CPC ... G06F 1/3206; G06F 1/3296; H04L 41/0813
See application file for complete search history.

(56) References Cited

U.S. PATENT DOCUMENTS

| | | | |
|---|---|---|---|
| 2009/0235105 A1 | 9/2009 | Branover et al. | |
| 2012/0207018 A1* | 8/2012 | Goldenberg | ............ H04L 12/12 |
| | | | 370/230 |
| 2014/0161447 A1 | 6/2014 | Graves et al. | |
| 2015/0381528 A9 | 12/2015 | Davis et al. | |

(Continued)

OTHER PUBLICATIONS

International Search Report and Written Opinion for International Application No. PCT/US2024/031171, mailed Sep. 5, 2024, 17 Pages.

(Continued)

*Primary Examiner* — Stefan Stoynov
(74) *Attorney, Agent, or Firm* — Rutan & Tucker, LLP; Ravi Mohan; Marc McClain

(57) ABSTRACT

Devices, systems, methods, and processes for sustainably operating a plurality of network planes via de-energization and re-energization is described herein. In many network configurations, a plurality of planes exist that allow for more modular connections in a network fabric. Often, these planes are configured such that each plane is not directly connected to another plane. Because of this, various embodiments described herein can evaluate network conditions and determine if there are conditions suitable to de-energize a plane by either directing the plane to enter a lower-power mode, by shutting off the plane, or disconnecting the available power. This de-energization period can be for a period of time or can occur until a triggering event is detected that indicates that the plane should be re-energized. These determinations can be done based on current traffic trends or historical conditions. They may also be heuristic-based or generated via one or more machine-learning processes.

18 Claims, 11 Drawing Sheets

(56)                    References Cited

U.S. PATENT DOCUMENTS

| 2016/0373354 | A1 | 12/2016 | Davis et al. |
| 2019/0155370 | A1 | 5/2019 | Ramani et al. |
| 2020/0322838 | A1 | 10/2020 | Thubert et al. |
| 2021/0320820 | A1 | 10/2021 | Ruan et al. |

OTHER PUBLICATIONS

Kattepur A., et al., "MALTA: Multi-Agent Reinforcement Learning for Differentiated Services in Fat Tree Networks", 2021 IEEE Conference on Network Function Virtualization and Software Defined Networks (NFV-SDN), IEEE, Nov. 9, 2021, pp. 129-134, XP033997786, DOI: 10.1109/NFV-SDN53031.2021.9665119, Retrieved on Dec. 28, 2021, The Whole Document.

Streiffer C., et al., "DeepConf: Automating Data Center Network Topologies Management with Machine Learning", arXiv:1712.03890v1, Cornell University Library, 201 Olin Library Cornell University Ithaca, NY 14853, Dec. 11, 2017, 8 Pages. XP080841849, Abstract, Figures 1, 2 p. 3, Left-hand Column Paragraph 1 Paragraphs [03.1], [03.2], [0004], Figure 4.

Sharma, P., et al. "Why AI-Powered RAN is an Energy Efficiency Breakthrough," https://www.ericsson.com/en/blog/2023/1/ai-powered-ran-energy-efficiency, Jan. 12, 2023.

* cited by examiner

600

STOP UTILIZING A PLANE — 610

DE-ENERGIZE THE PLANE — 620

OPERATE NETWORK WITH DE-ENERGIZED PLANE — 630

635

HAS A CONDITION OR THRESHOLD BEEN REACHED ?

NO

YES

RE-ENERGIZE THE PLANE — 640

RESUME UTILIZING THE PLANE — 650

FIG. 7

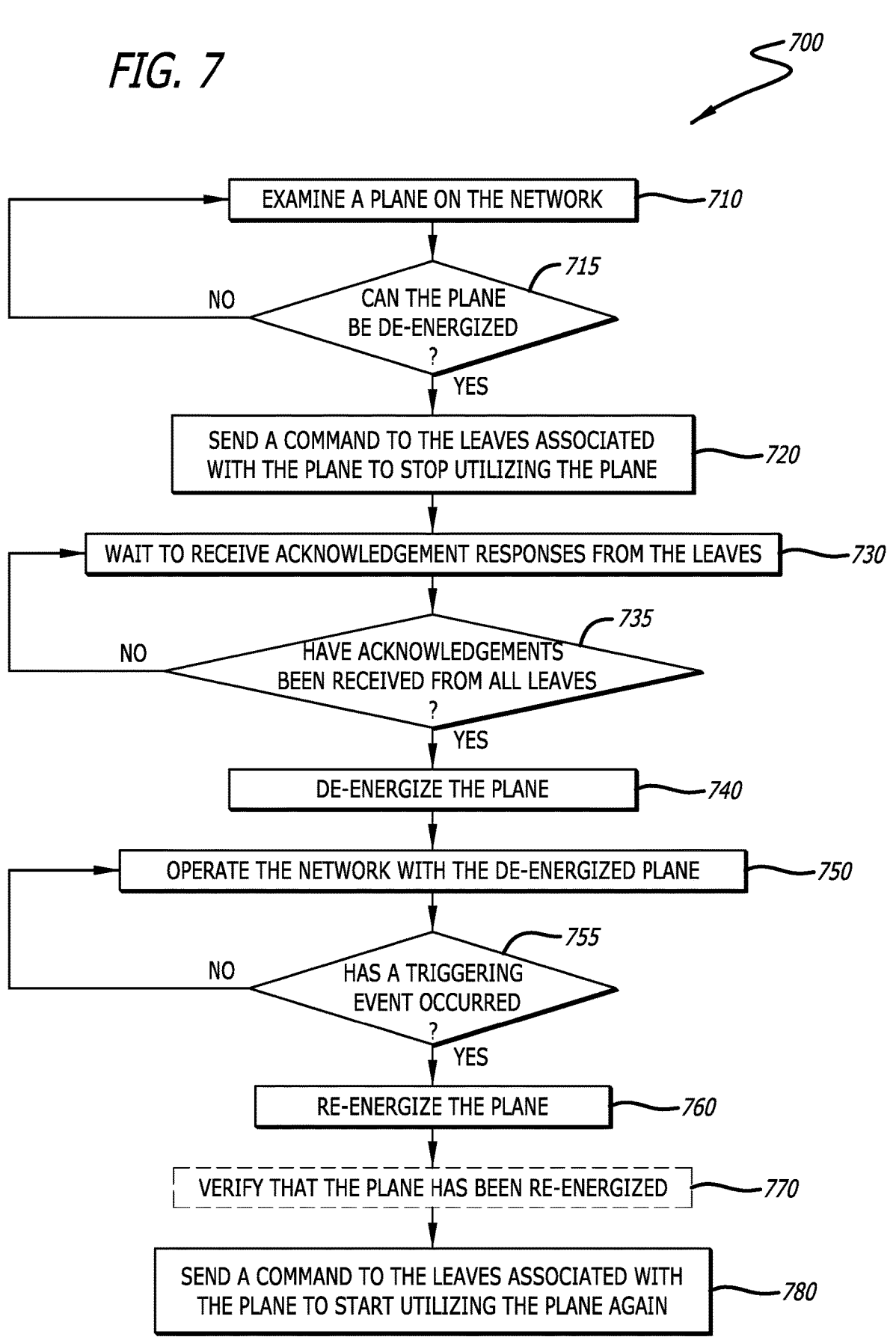

700

EXAMINE A PLANE ON THE NETWORK — 710

CAN THE PLANE BE DE-ENERGIZED ? — 715

NO

YES

SEND A COMMAND TO THE LEAVES ASSOCIATED WITH THE PLANE TO STOP UTILIZING THE PLANE — 720

WAIT TO RECEIVE ACKNOWLEDGEMENT RESPONSES FROM THE LEAVES — 730

HAVE ACKNOWLEDGEMENTS BEEN RECEIVED FROM ALL LEAVES ? — 735

NO

YES

DE-ENERGIZE THE PLANE — 740

OPERATE THE NETWORK WITH THE DE-ENERGIZED PLANE — 750

HAS A TRIGGERING EVENT OCCURRED ? — 755

NO

YES

RE-ENERGIZE THE PLANE — 760

VERIFY THAT THE PLANE HAS BEEN RE-ENERGIZED — 770

SEND A COMMAND TO THE LEAVES ASSOCIATED WITH THE PLANE TO START UTILIZING THE PLANE AGAIN — 780

FIG. 8

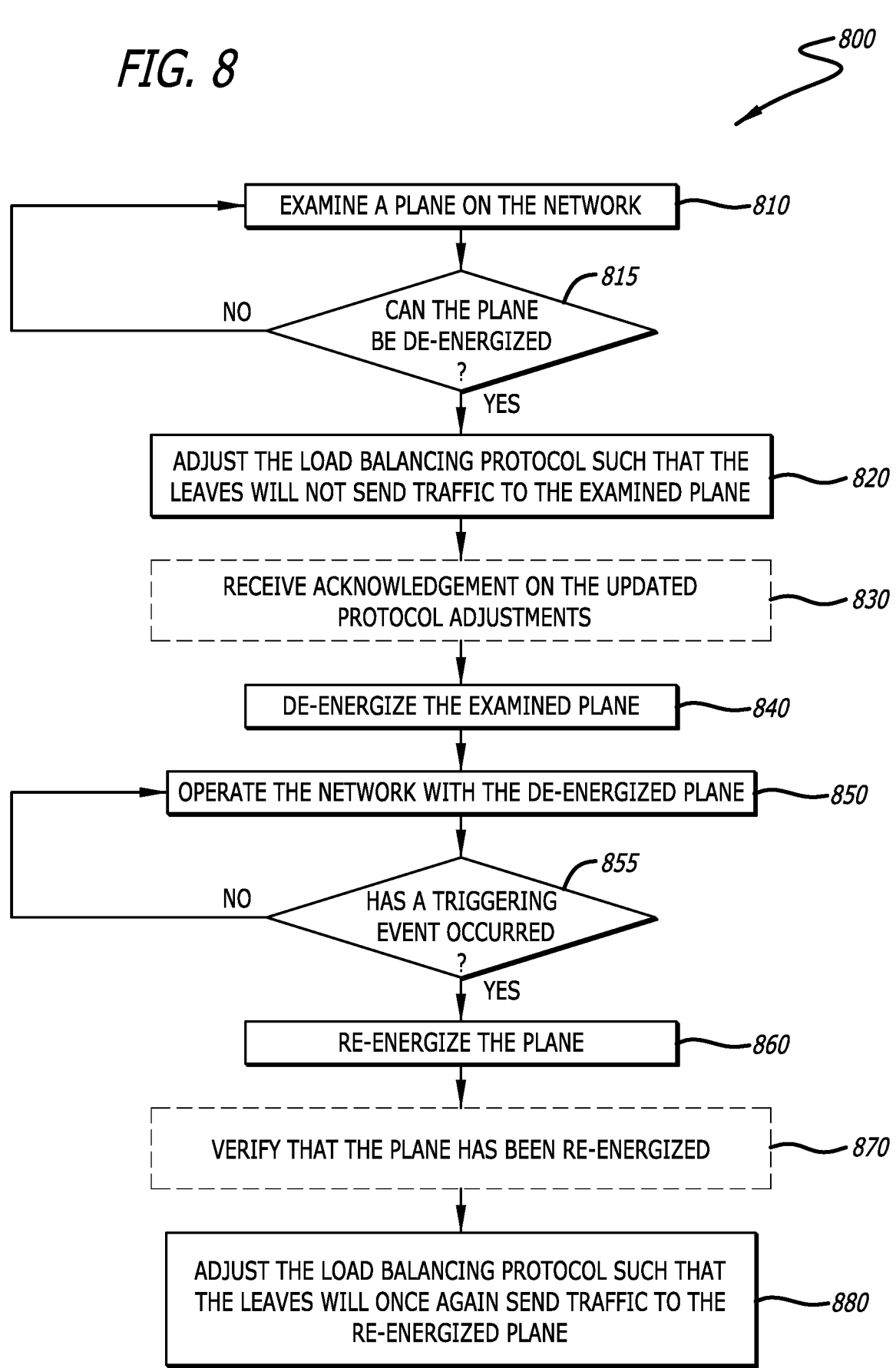

800

EXAMINE A PLANE ON THE NETWORK — 810

815 CAN THE PLANE BE DE-ENERGIZED ?
NO
YES

ADJUST THE LOAD BALANCING PROTOCOL SUCH THAT THE LEAVES WILL NOT SEND TRAFFIC TO THE EXAMINED PLANE — 820

RECEIVE ACKNOWLEDGEMENT ON THE UPDATED PROTOCOL ADJUSTMENTS — 830

DE-ENERGIZE THE EXAMINED PLANE — 840

OPERATE THE NETWORK WITH THE DE-ENERGIZED PLANE — 850

855 HAS A TRIGGERING EVENT OCCURRED ?
NO
YES

RE-ENERGIZE THE PLANE — 860

VERIFY THAT THE PLANE HAS BEEN RE-ENERGIZED — 870

ADJUST THE LOAD BALANCING PROTOCOL SUCH THAT THE LEAVES WILL ONCE AGAIN SEND TRAFFIC TO THE RE-ENERGIZED PLANE — 880

SUSTAINABLE NETWORKING PLANE DE-ENERGIZATION

The present disclosure relates to networking administration. More particularly, the present disclosure relates to sustainability de-energizing and re-energizing networking planes.

BACKGROUND

In networking, a pod and plane networking structure is often utilized to achieve manageable and modular network connections. As the name suggest, this networking infrastructure is organized into two primary components: pods and planes.

Pods often refer to groups of interconnected devices or network components that work together to achieve a specific purpose or function. These devices can include computers, servers, routers, switches, or any other network equipment. Pods are designed to be localized and self-contained, allowing for efficient and reliable communication within a specific area or for a particular application. They form the building blocks of the network, where devices within a pod can communicate with each other directly over local network links.

In networking, a pod and plane networking structure is often utilized to achieve manageable and modular network connections. As the name suggest, this networking infrastructure is organized into two primary components: pods and planes.

On the other hand, planes represent logical layers or segments within the networking infrastructure that provide specific functionalities and services. The most common planes include the control plane, data plane, and management plane. The control plane can be responsible for network management and coordination. It may handle tasks such as routing, addressing, and configuring devices within the network.

Data planes, also known as forwarding planes, is often responsible for the actual forwarding and transmission of data packets across the network. It can perform tasks such as packet forwarding, switching, and routing based on the instructions provided by the control plane. Lastly, management planes can handle the overall management and monitoring of the network infrastructure. It often includes functions such as device configuration, monitoring performance, collecting network statistics, and applying security policies. However, those skilled in the art will recognize that a variety of plane types and configurations are possible when designing network architectures.

Overall, the basic pod and plane networking structure involves organizing devices into pods for efficient communication within a localized area, while planes provide the necessary functionalities for network management, data forwarding, and overall infrastructure management. This structure allows for scalable, reliable, and manageable networking environments. However, it is often the case that each pod and plane can stay in a fully powered state at all times. As network administrators attempt to increase the overall sustainability of the network, this can be counterproductive.

SUMMARY OF THE DISCLOSURE

Systems and methods for sustainability de-energizing and re-energizing networking planes in accordance with embodiments of the disclosure are described herein. In some embodiments, a device, comprises a processor, a memory communicatively coupled to the processor, and a communication port coupled with a second device within a network including two or more planes. Each plane is connected to a plurality of pods through one or more spine connections. The device further comprises a plane monitoring logic which can be configured to select at least one plane to de-energize, stop utilizing the selected at least one plane, and de-energize the at least one plane. The logic can further be configured to operate the network with the de-energized at least one plane, monitor a plurality of values on the network against at least one threshold value, and re-energize, in response to the at least one threshold value being exceeded, the at least one plane, and resume utilizing the at least one plane.

In some embodiments, selecting the at least one plane to be de-energized can be based on one or more network values.

In some embodiments, the plane monitoring logic is further configured to monitor the one or more network values.

In some embodiments, the selecting of the at least one plane to de-energize is in response to a threshold value being exceeded.

In some embodiments, the threshold is compared against the one or more network values.

In some embodiments, the one or more network values are associated with current network traffic levels.

In some embodiments, the one or more network values are associated with predicted network traffic levels.

In some embodiments, the plane monitoring logic is configured to stop utilizing the selected at least one plane by sending a command to a plurality of leaves associated with the plurality of pods connected to the at least one plane to stop utilizing the at least one plane.

In some embodiments, the plane monitoring logic is further configured to receive an acknowledgement from the plurality of leaves associated with the plurality of pods prior to de-energizing the at least one plane.

In some embodiments, a device, wherein the plane monitoring logic is configured to stop utilizing the selected at least one plane by adjusting a load balancing protocol such that the leaves associated with the plurality of pods connected to the at least one plane to stop sending traffic to the at least one plane.

In some embodiments, the plane monitoring logic is further configured to receive an acknowledgement associated with the adjusted load balancing protocol adjustments prior to de-energizing the at least one plane.

In some embodiments, the plane monitoring logic is configured to stop utilizing the selected at least one plane by transmitting a protocol signal that the at least one plane has been disrupted such that the plurality of leaves associated with the plurality of pods connected to the at least one plane to stop sending traffic to the at least one plane.

In some embodiments, the plane monitoring logic is further configured to receive an acknowledgement associated with the transmitted protocol signal prior to de-energizing the at least one plane.

In some embodiments, the plane monitoring logic is further configured to verify that the at least one plane has been re-energized prior to resuming utilizing the at least one plane.

In some embodiments, a control plane, comprises a processor, a memory communicatively coupled to the processor, and a communication port coupled with at least one other plane within a network wherein each of the planes is connected to a plurality of pods through one or more spine connections. The device can also comprise a plane monitoring logic configured to select at least one plane to de-energize, stop utilizing the selected at least one plane, de-energize the at least one plane, and monitor the network for at least one triggering event. The plane monitoring logic can be further configured to re-energize, in response to the at least one triggering event, the at least one plane, and resume utilizing the at least one plane.

In some embodiments, the plane monitoring logic is further configured to examine itself and the at least one other plane prior to selecting at least one plane to de-energize.

In some embodiments, the plane monitoring logic is further configured to verify that the at least one plane has been re-energized prior to resuming utilizing the at least one plane.

In some embodiments, a method of de-energizing a plane in a network, comprises selecting at least one plane to de-energize, stopping utilizing the selected at least one plane, and de-energizing the at least one plane. The method can also include monitoring a plurality of values on the network against at least one threshold value, and re-energizing, in response to the at least one threshold value being exceeded, the at least one plane, and resuming utilizing the at least one plane.

In some embodiments, the method further includes examining the at least one plane prior to selecting at least one plane to de-energize.

In some embodiments, the method further includes verifying that the at least one plane has been re-energized prior to resuming utilizing the at least one plane.

Other objects, advantages, novel features, and further scope of applicability of the present disclosure will be set forth in part in the detailed description to follow, and in part will become apparent to those skilled in the art upon examination of the following or may be learned by practice of the disclosure. Although the description above contains many specificities, these should not be construed as limiting the scope of the disclosure but as merely providing illustrations of some of the presently preferred embodiments of the disclosure. As such, various other embodiments are possible within its scope. Accordingly, the scope of the disclosure should be determined not by the embodiments illustrated, but by the appended claims and their equivalents.

BRIEF DESCRIPTION OF DRAWINGS

The above, and other, aspects, features, and advantages of several embodiments of the present disclosure will be more apparent from the following description as presented in conjunction with the following several figures of the drawings.

FIG. 7 is a flowchart depicting a process for de-energizing a plane via leaf commands in accordance with various embodiments of the disclosure;

FIG. 8 is a flowchart depicting a process for de-energizing a plane via load balancing protocol adjustments in accordance with various embodiments of the disclosure;

Figure 1:
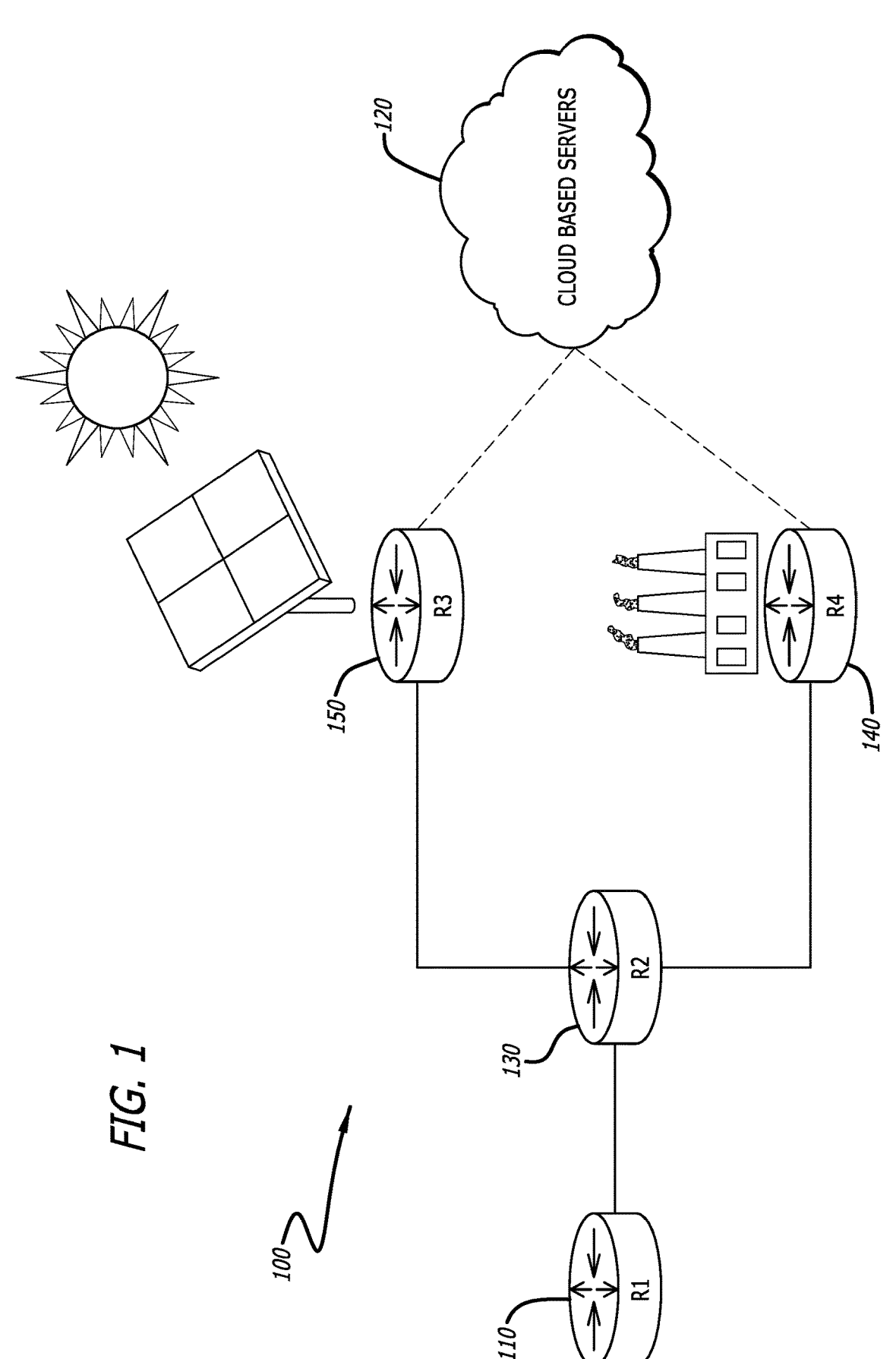
FIG. 1 is a conceptual diagram of a network comprising multiple network devices with various sources of power in accordance with various embodiments of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

In response to the issues described above, devices and methods are discussed herein that can sustainably de-energize and re-energize planes within a network. As those skilled in the art will recognize, datacenter networks are typically organized as (recursive) Clos fabric or fat tree. These Clos and fat-tree topologies have gained prominence in today's networking, primarily as a result of the paradigm shift towards a centralized data-center based architecture that is poised to deliver a majority of computation and storage services in the future. As a result, data centers often have a large number of network devices that are configured into planes which are shown in more detail below.

In a multi-plane environment, only the leaves see all the planes. Once the leave places a packet in a plane, that packet will follow the plane till the destination, meaning that each plane is its own parallel Equal Cost Multi-Path (ECMP) network from leaf to leaf. These planes often operate at all times and without power-saving algorithms, can limit the amount of energy conservation that can be achieved. Various embodiments described herein can conserve power while operating the data center. As a result, the planes could be powered off, or de-energized, independently when not needed, which reduces the amount of load balancing (and thus the aggregate bandwidth) leaf to leaf.

Usually, during network capacity planning network administrators may have to decide the amount of bandwidth needed at the super-spine level. This increases redundancy but the consequence is that this results in decreased energy efficiency. Initially, the amount of bandwidth in the spine/superspine level was less than the access, but it was found that such overbooking was highly detrimental to traffic at peak time, so the rule of a thumb in modern networks is that the bandwidth north and south of a switch should be equivalent. But then, this creates the inverse effect that the bandwidth is largely sub-utilized when only a subset of the leaves is loaded.

Given that most Clos/fat-tree networks have excess capacity, it is beneficial that when traffic from leaves do not go past a certain threshold, the spine/super-spine may be a candidate to shut off. For example, in order to keep buffering at check, and allow for redundancy many links are loaded to 50% of their capacity. However, given that aggregate total bandwidth of the network is much higher it is possible to trade off these values. A controller, such as a control plane, or other network administration suite, can be configured to easily evaluate the ingress traffic load on a plane. In some embodiments, once the ingress load falls below 50% this plane may be a candidate plane to move its traffic to other planes and be de-energized. This selected plane can follow one or more graceful migration procedures and move the traffic from parts of this plane by increasing the routing metrics. Additionally, weighted ECMP can ensure that traffic flows are migrated away from these planes.

By continually migrating traffic, nodes in the plane may be brought down gradually with an effective goal of shutting down the entire plane or a high fraction of the nodes/plane. Certain embodiments may actually utilize a sliding scale to dial down the bandwidth required from a plane based on traffic characteristics. The controlling device can be configured to decide whether to keep partial lights on to avoid hysteresis of repeated "off and on" behavior. When a plane is disabled, the leaves can often be responsible for selecting a plane destination that is not currently powered down. So, as is shown in more detail below, one or more planes would be de-energized, and a leaf would have to select a destination plane. This is simply achieved by using graceful migration and, in some embodiments, by weighting one or more protocol features that exist, such as those in ECMP. In certain embodiments, similar functionality can be achieved by enhancing the interior gateway protocol to carry additional data.

These de-energized planes can also be determined based on a minimum network performance metric such that performance is not affected. A number of embodiments may keep an additional throughput of 10-15% for hash inefficiency with weighted ECMP. For maintenance or load balancing needs, the planes selected to de-energize can be rotated or somewhat evenly distributed. This determination can be done based on the overall data being processed. (E.g., no planes powered off when data exceeds X level, 1 plane can be shut off if data is less than X, 2 planes shut off is data is less than Y, which is less than X, etc. which can be learned by a dynamic active classification algorithm.) Such a determination can also include a buffer of bandwidth that may be needed on short notice (before a de-energized plane can be re-energized and resume operations). Machine learning operations can be utilized in certain embodiments to predict usage and whether congestion or upcoming bandwidth will be needed. In further embodiments, there could be a heuristic baseline that is supplemented by one or more machine-learning models and associated predictions.

In various embodiments, a routing protocol extension may be leveraged to prepare for de-energization, and re-energization. Alternately, a controller or other device in the network may be able to perform the same set of actions. The control can be handled from any spine or superspine node in the plane. In additional embodiments, time variant routing may be utilized.

Based on a time series and/or machine-learning prediction, the number of planes required is predicted and a schedule is put in place for each plane de-energization with dates. The dates are separated with enough time to ensure that the leaves have all stopped using a plane before the plane is de-energized, and enough time for the plane to re-energize before the leaves resume using the plane.

It is contemplated that there may be a minimum threshold of planes and a fraction of the nodes in the planes that will be always on. It is further contemplated that during normal operations all planes are active—this is the full-on topology state. For an aggressive approach, the network may be configured in a bare bones state on the suggested templates, sustainable configurations, and/or machine-learning processes. In many embodiments, a setting to allow the network to operate in a state in between these two configurations is possible.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system." Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom VLSI circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising,"

"having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, a conceptual diagram of a network 100 comprising multiple network devices with various sources of power in accordance with various embodiments of the disclosure is shown. The network 100 can include a plurality of devices, e.g., routers 110, 130, 140 and 150, which can be in communication with each other and/or a remote server, such as a cloud-based server 120. The network 100 depicted in FIG. 1 is shown as a simplified, conceptual network. Those skilled in the art will understand that a network 100 can include a large variety of devices and be arranged in a virtually limitless number of combinations based on the desired application and available deployment environment.

Additionally, it is recognized that the terms "power" and "energy" are often used interchangeably in many colloquial settings but have distinct differences. Specifically, energy is accepted as the capacity of a system or device to do work (such as in kilowatt-hours (kWh)), while power is the rate at which energy is transferred (often in watts (W)). Power represents how fast energy is being used or produced. With this in mind, it should be understood that various elements of the present disclosure may utilize common terms like "power lines," "power grids," power source," "power consumption," and "power plant" when describing energy delivery and utilization, even though those skilled in the art will recognize that those elements are delivering or processing energy (specifically electricity) at a certain rate of power. References to these terms are utilized herein specifically to increase the ease of reading.

Traditionally, devices operating within a network 100 have not considered various aspects of operation that can relate to the overall sustainability of the network. For example, devices in communication networks have often used grid-supplied energy as a primary power source. This grid-supplied energy can regularly provide energy that has been generated by a negative environmental impacts-heavy power source such as a coal-powered power plant. However, modern power grids often have more diverse and cleaner energy sources for the provided generated energy. Some devices can still be powered by power sources that utilize fossil fuels, such as the router R4 140 as depicted in FIG. 1. Alternatively, some devices can operate by using renewable sources of energy, such as the router R3 150 which is conceptually depicted as being powered by solar power.

Those skilled in the art will recognize that the generation of electricity within the various power plants often creates some pollution or, more generally, one or more negative environmental impacts, which can often come in the form of emissions. However, these negative environmental impacts can come in a variety of forms including, but not limited to, land use, ozone depletion, ozone formation inhibition, acidification, eutrophication (freshwater, marine, and terrestrial), abiotic resource depletion (minerals, metals, and fossil fuels), toxicity, water use, negative soil quality change, ionizing radiation, hazardous waste creation, etc. As such, these negative environmental impact measurements can be measured with specific units to quantify these changes. Various aspects of energy use can be associated with one or more of these negative environmental impacts and classified as one or more sustainability-related attributes.

In the embodiment depicted in FIG. 1, the operation of a coal-powered power plant will create a sizeable amount of negative environmental impacts in the form of carbon emissions and the like. Contrast that with a solar array which may not create emissions when generating electricity, but may negative environmental impacts, such as carbon emission generation, associated with the production and/or disposal of the solar array. Various methods of measuring these negative environmental impacts may occur. One measurement may be to examine the waste products created by the power generated (such as nuclear waste, vs. solar array e-waste, etc.).

Another measurement of negative environmental impacts that can be utilized when comparing power sources is to determine the amount of greenhouse or carbon emissions released per unit of electricity generated. Specifically, various embodiments described herein may utilize the $CO_2e$ kg/kWh metric which measure the amount of kilowatt hours produced per kilogram of carbon dioxide gases released into the environment. Therefore, when discussing a negative environmental impacts-heavy power source compared to a clean(er) power source, the clean power source can, for example, have a better $CO_2e$ kg/kWh rating compared to the negative environmental impacts-heavy power source. Utilizing a cleaner power source thus provides for a more sustainable network operation.

In order the maximize the overall sustainability of a network, it may be desirable to increase the use of cleaner power sources with a lower overall negative environmental impact as opposed to power sources with a higher overall negative environmental impact when operating the network. Thus, there can be a need to be aware of the source of energy provided at each device along the route of data travel. Additionally, other factors such as the attributes unique to each device can be factored in, along with the current and/or expected traffic, etc. Once known, an optimal method of traversing the data may need to be calculated. As discussed in more detail, this path algorithm can be utilized to better optimize the locations selected within a network for data travel.

Other methods may be utilized to increase sustainability in network operations. In many embodiments, the network devices themselves may have one or more features or other capabilities that can allow for a more efficient operation. For example, a network router may be operated in a lower power mode or be powered off entirely for a specific period of time or until an event occurs. Additional embodiments may utilize various other power-saving capabilities that can be turned on or off remotely or in response to an event or predetermined threshold being exceeded. Often, operations performed by the network devices can be utilized in scenarios where network performance will not be affected or is affected such that no loss in user experience occurs. By utilizing less power during operation, a higher level of sustainability can be achieved.

Together, the type of power source providing electricity to a network device, along with the various sustainability-related capabilities of the router can be understood as the sustainability-related attributes of that network device. During operation, one or more devices within the network may seek and collect the sustainability-related attributes of various network devices, which can provide insight into both the type of power source providing power to the device, but also the various capabilities of the network device that may be activated to provide more efficient operation.

Additionally, when generating various scores, metrics, or other evaluations of the network devices within a network 100, the sustainability-related attributes can vary based on a variety of factors such as the time of day, current network traffic, expected network traffic, and historical usage patterns. For example, a network router may receive energy from a solar power source during the day but receives energy from a coal-powered power plant at night. In these instances, an averaged score may be used, or a unique score may be generated at the time of operation. In another example, network traffic may be such that removing one or more network devices from the optimal sustainable data paths may negatively affect user experiences, such as when a sporting event occurs. As such, scores may be generated at numerous times depending on the desired application. Often, the act of measurement may negatively affect sustainability such that determining the proper amount of measurements for a given outcome may be determined.

Although a specific embodiment for a network 100 is described above with respect to FIG. 1, any of a variety of systems and/or processes may be utilized in accordance with embodiments of the disclosure. For example, the network could be broken into a plurality of partitions, wherein each partition could have specific needs, service level agreements, etc. that can alter sustainability-optimization. The elements depicted in FIG. 1 may also be interchangeable with other elements of FIGS. 2-11 as required to realize a particularly desired embodiment. Augmented protocols to carry out these described processes are described below.

Figure 2:
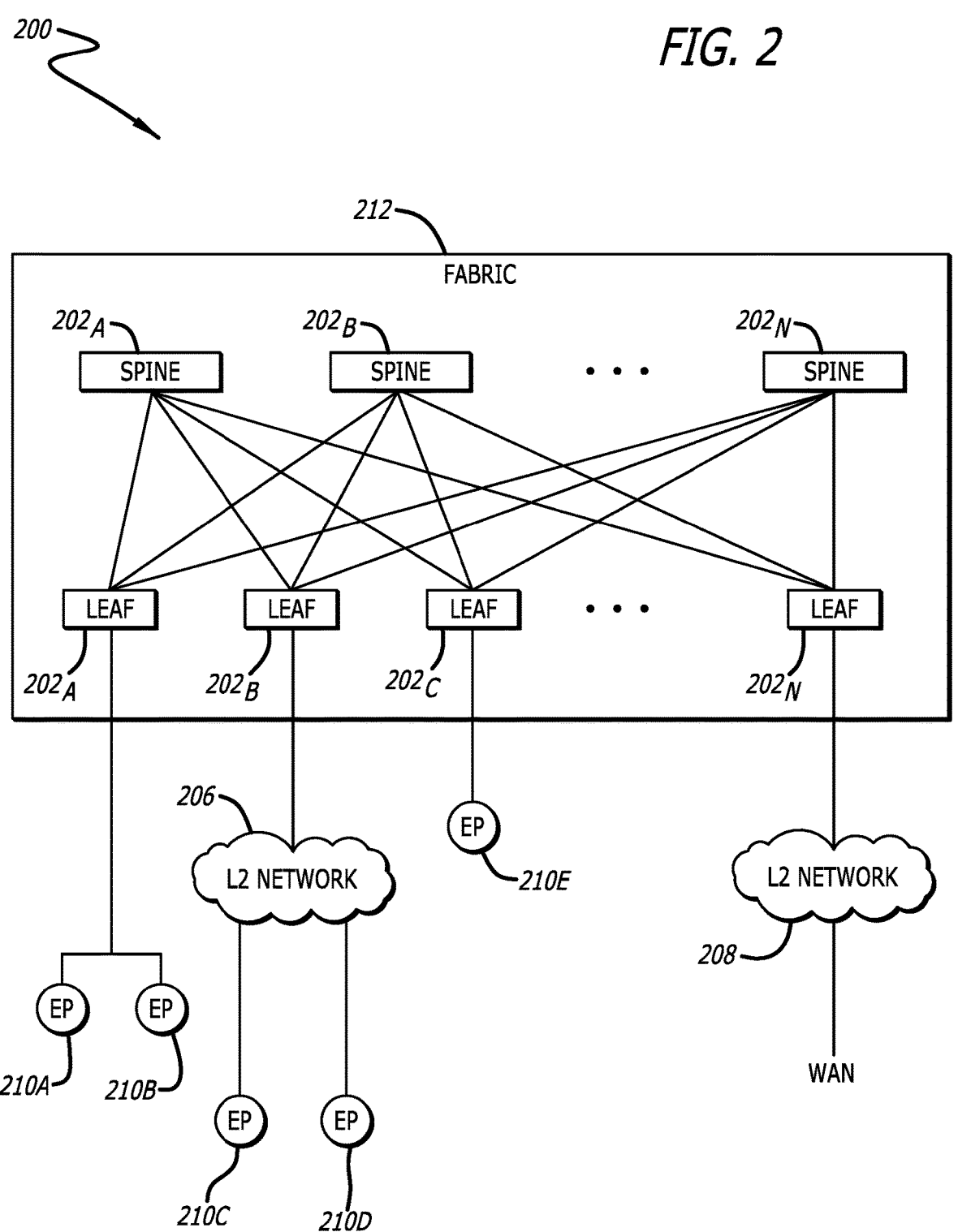
FIG. 2 is a conceptual schematic block diagram of an example architecture for a network fabric in accordance with various embodiments of the disclosure.

Referring to FIG. 2, a conceptual schematic block diagram of an example architecture for a network fabric in accordance with various embodiments of the disclosure is shown. The embodiment depicted in FIG. 2 illustrates a schematic block diagram of an example architecture 200 for a network fabric 212. The network fabric 212 can include spine switches $202_A$, $202_B$, . . . , $202_N$ (collectively "202") connected to leaf switches $204_A$, $204_B$, $204_C$ . . . $204_N$ (collectively "204") in the network fabric 212. As those skilled in the art will recognize, networking fabric can refer to a high-speed, high-bandwidth interconnect system that enables multiple devices to communicate with each other efficiently and reliably. It is a network topology that is designed to provide a flexible and scalable infrastructure for data center, cloud environments, and other network elements.

Various embodiments described herein can include a leaf-spine architecture comprising a plurality of spine switches and leaf switches. Spine switches 202 can be L3 switches in the fabric 212. However, in some cases, the spine switches 202 can also, or otherwise, perform L2 functionalities. Further, the spine switches 202 can support various capabilities, such as, but not limited to, 40 or 10 Gbps Ethernet speeds. To this end, the spine switches 202 can be configured with one or more 40 Gigabit Ethernet ports. In certain embodiments, each port can also be split to support other speeds. For example, a 40 Gigabit Ethernet port can be split into four 10 Gigabit Ethernet ports, although a variety of other combinations are available.

In many embodiments, one or more of the spine switches 202 can be configured to host a proxy function that performs a lookup of the endpoint address identifier to locator mapping in a mapping database on behalf of leaf switches 204 that do not have such mapping. The proxy function can do this by parsing through the packet to the encapsulated tenant packet to get to the destination locator address of the tenant. The spine switches 202 can then perform a lookup of their local mapping database to determine the correct locator address of the packet and forward the packet to the locator address without changing certain fields in the header of the packet.

In various embodiments, when a packet is received at a spine switch $202_i$, wherein subscript "i" indicates that this operation may occur at any spine switch $202_A$ to $202_N$, the spine switch $202_i$ can first check if the destination locator address is a proxy address. If so, the spine switch $202_i$ can perform the proxy function as previously mentioned. If not, the spine switch $202_i$ can look up the locator in its forwarding table and forward the packet accordingly.

In a number of embodiments, one or more spine switches 202 can connect to one or more leaf switches 204 within the fabric 212. Leaf switches 204 can include access ports (or non-fabric ports) and fabric ports. Fabric ports can provide uplinks to the spine switches 202, while access ports can provide connectivity for devices, hosts, endpoints, VMs, or external networks to the fabric 212.

In more embodiments, leaf switches 204 can reside at the edge of the fabric 212, and can thus represent the physical network edge. In some cases, the leaf switches 204 can be top-of-rack ("ToR") switches configured according to a ToR architecture. In other cases, the leaf switches 204 can be aggregation switches in any particular topology, such as end-of-row (EoR) or middle-of-row (MoR) topologies. The leaf switches 204 can also represent aggregation switches, for example.

In additional embodiments, the leaf switches 204 can be responsible for routing and/or bridging various packets and applying network policies. In some cases, a leaf switch can perform one or more additional functions, such as implementing a mapping cache, sending packets to the proxy function when there is a miss in the cache, encapsulate packets, enforce ingress, or egress policies, etc. Moreover, the leaf switches 204 can contain virtual switching functionalities, such as a virtual tunnel endpoint (VTEP) function as explained below in the discussion of FIG. 4. To this end, leaf switches 204 can connect the fabric 212 to an overlay network.

In further embodiments, network connectivity in the fabric 212 can flow through the leaf switches 204. Here, the leaf switches 204 can provide servers, resources, endpoints, external networks, or VMs access to the fabric 212, and can connect the leaf switches 204 to each other. In some cases, the leaf switches 204 can connect endpoint groups to the fabric 212 and/or any external networks. Each endpoint group can connect to the fabric 212 via one of the leaf switches 204, for example.

Endpoints 210 A-E (collectively "210", shown as "EP") can connect to the fabric 212 via leaf switches 204. For example, endpoints 210A and 210B can connect directly to leaf switch 204A, which can connect endpoints 210A and 210B to the fabric 212 and/or any other one of the leaf switches 204. Similarly, endpoint 210E can connect directly to leaf switch 204C, which can connect endpoint 210E to the fabric 212 and/or any other of the leaf switches 204. On the other hand, endpoints 210C and 210D can connect to leaf switch 204B via L2 network 206. Similarly, the wide area network (WAN) can connect to the leaf switches 204C or 204D via L3 network 208.

In certain embodiments, endpoints 210 can include any communication device, such as a computer, a server, a switch, a router, etc. In some cases, the endpoints 210 can include a server, hypervisor, or switch configured with a VTEP functionality which connects an overlay network, such as overlay network 400 below, with the fabric 212. For example, in some cases, the endpoints 210 can represent one or more of the VTEPs 408 A-D illustrated in FIG. 4. Here, the VTEPs 408 A-D can connect to the fabric 212 via the leaf switches 204. The overlay network can host physical devices, such as servers, applications, endpoint groups, virtual segments, virtual workloads, etc. In addition, the endpoints 210 can host virtual workload(s), clusters, and applications or services, which can connect with the fabric 212 or any other device or network, including an external network. For example, one or more endpoints 210 can host, or connect to, a cluster of load balancers or an endpoint group of various applications.

Although a specific embodiment for an architecture is described above with respect to FIG. 2, any of a variety of systems and/or processes may be utilized in accordance with embodiments of the disclosure. For example, the architecture 200 could comprise any variety of endpoints, spine switches, and/or leaf switches. The elements depicted in FIG. 2 may also be interchangeable with other elements of FIGS. 1 and 3-11 as required to realize a particularly desired embodiment.

Figure 3:
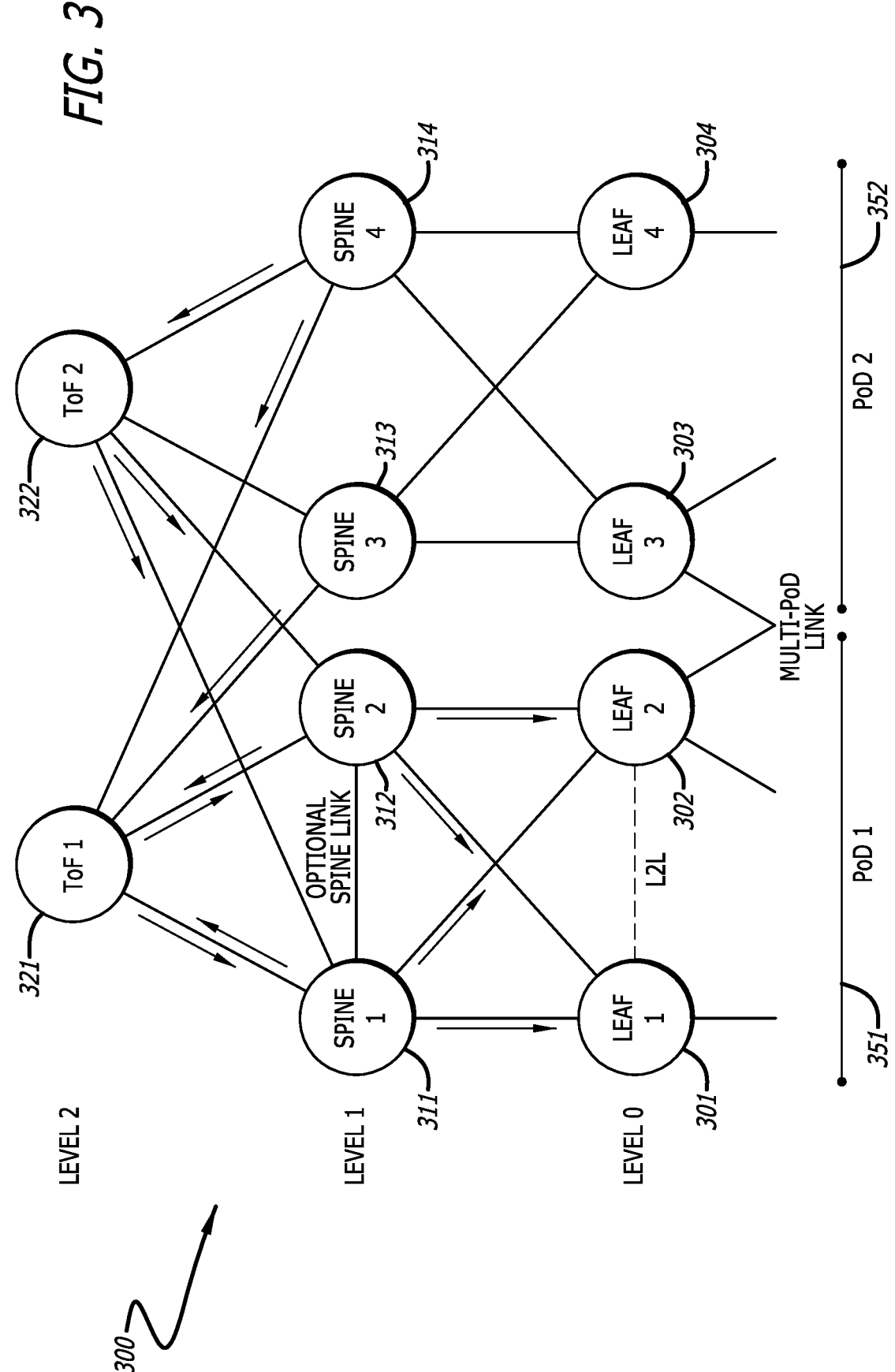
FIG. 3 is a conceptual schematic diagram of a spine and leaf network architecture in accordance with various embodiments of the disclosure.

Referring to FIG. 3, a conceptual schematic diagram of a spine and leaf network architecture 300 in accordance with various embodiments of the disclosure is shown. Although there are numerous ways to deploy a network, a popular structure is a spine and leaf network. In these deployments, a series of leaves are connected to a plurality of spine switches. In turn, these spine switches are often connected to a plurality of "top of fabric" (ToF) switches. Often, these leaves are arranged within one or more "point of delivery" (PoD) groups.

In the embodiment depicted in FIG. 3, leaf 1 301 and leaf 2 302 are in a series within a first POD 1 351. Leaf 1 301 and Leaf 2 302 are each connected to a first Spine 1 311 and second Spine 2 312. In many embodiments, each of the leaves are not connected to each other, however, the embodiment depicted in FIG. 3 shows an optional leaf-to-leaf (L2L) connection between Leaf 1 301 and Leaf 2 302.

Similarly, Leaf 3 303 and Leaf 4 304 are in a series within a second PoD 2 352. In certain embodiments, such as the embodiment depicted in FIG. 3, the PoDs may have a multi-POD link connection. Leaf 3 303 and Leaf 4 304 are also each connected to both Spine 3 313 and Spine 4 314. Each of the leaves are configured as level 0 whereas the spine switches are configured as level 1 connections.

In a variety of embodiments, each of the spines associated with each POD are connected to each of the plurality of ToF connections. Specifically, in the embodiment depicted in FIG. 3, Spine 1 311 and Spine 2 312 are connected to both the first ToF 1 321 and the second ToF 2 322, while the third Spine 3 313 and fourth Spine 4 314 are also connected to both ToF 1 321 and ToF 2 322.

Although a specific embodiment for a spine and leaf network architecture is described above with respect to FIG. 3, any of a variety of systems and/or processes may be utilized in accordance with embodiments of the disclosure. For example, the spine and leaf network architecture 300 is depicted in a simplified form in the embodiment of FIG. 3 for ease of understanding whereas those skilled in the art will recognize that any number of leaves, spines, or top of fabrics can be interconnected in the fashion described herein. The elements depicted in FIG. 3 may also be interchangeable with other elements of FIGS. 1-2 and 4-10 as required to realize a particularly desired embodiment.

Figure 4:
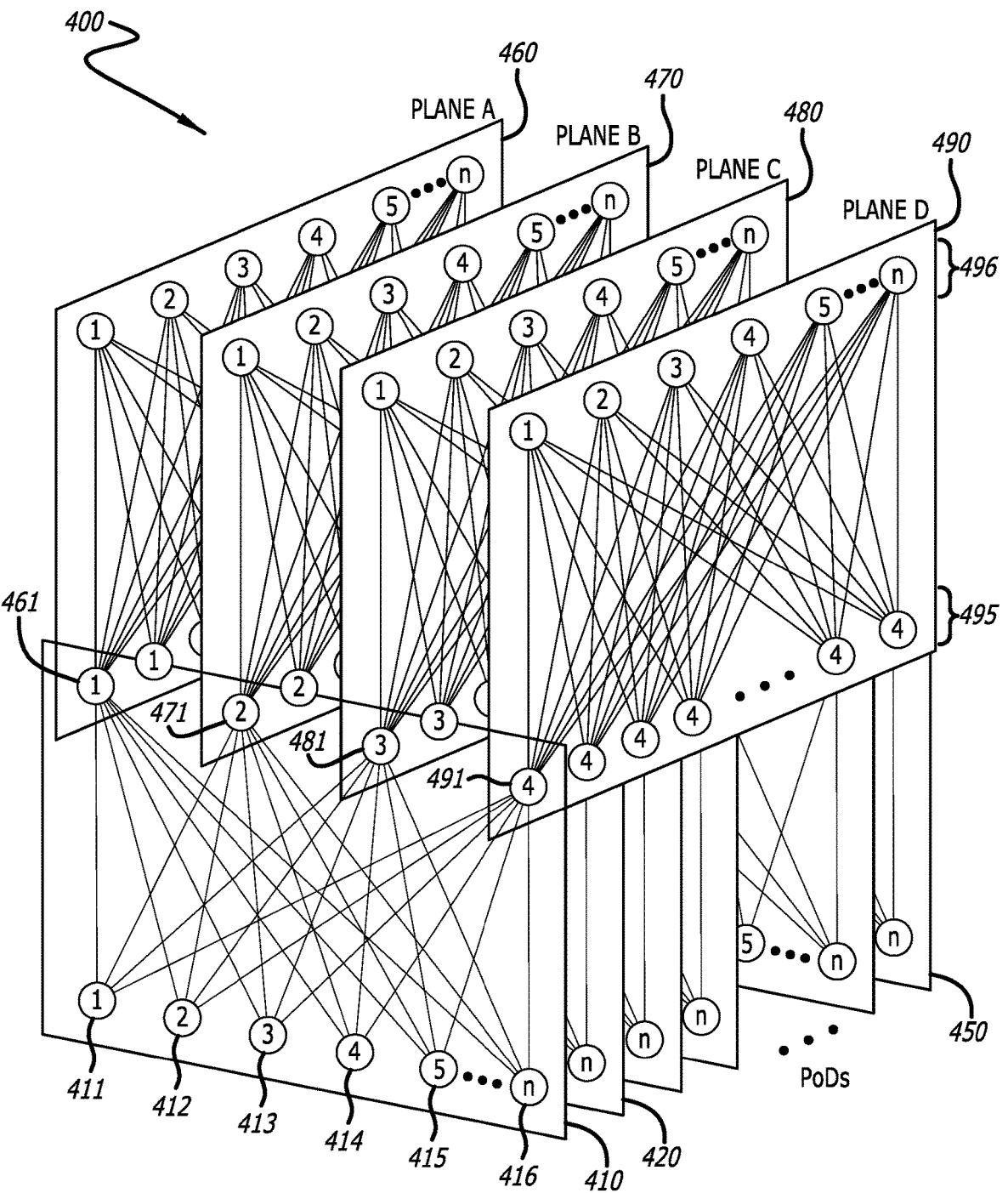
FIG. 4 is a conceptual schematic diagram of a plane and pod network architecture in accordance with various embodiments of the disclosure.

Referring to FIG. 4, a conceptual schematic diagram of a plane and pod network architecture 400 in accordance with various embodiments of the disclosure is shown. This can be understood as a more detailed version of the leaf and spine network architecture described in FIG. 3. Specifically, various embodiments comprise a series of PoDs connected to a plurality of Planes.

In the embodiment depicted in FIG. 4, a first POD 410 comprises a series of top of rack connections depicted as circles at the bottom of the POD. There can be any number of connections, but in the specific embodiment of FIG. 4, there is a first leaf 511, second leaf 512, third leaf 513, fourth leaf 514, fifth leaf 515, and nth leaf 516. This is depicted to conceptually convey that any number of leaves may be configured within each POD.

In many embodiments, additional PoDs can have similar connections. In the embodiment of FIG. 4, there is a first POD 410, second POD 420, up through an nth POD 450. In various embodiments, each POD can be configured with a plurality of spine switches which can each be connected to every leaf within a POD. In the embodiment depicted in FIG. 4, the first POD 410 has a connection to a first spine switch 461, a second spine switch 471, a third spine switch 481 and a fourth spine switch 491.

These spine switches can be connected to or otherwise associated with a plane. Each plane can have a plurality of spine switches that are often configured as the same type of connection across the series of PoDs. For example, in the embodiment depicted in FIG. 4, plane A 460 has a plurality of spine switches connected to the series of PoDs all as a first spine switch 461. Likewise, plane B 470 is configured to have a plurality of spine switches that are the second spine switch 471 across the series of PoDs. Plane C is configured across the series of PoDs with a plurality of third spine switches 481, while plane D is configured with a plurality of forth spine switches 495 across the series of PoDs.

As those skilled in the art will recognize, the configuration of the plane and pod network architecture 400 allows for efficient connections, scalability, and modularity, while each plane operates without a connection to other planes, unless a specific link is deployed. With this type of setup, it may be possible to de-energize one or more planes without directly affecting the performance of the remaining planes. An example of this configuration is described below.

Figure 5:
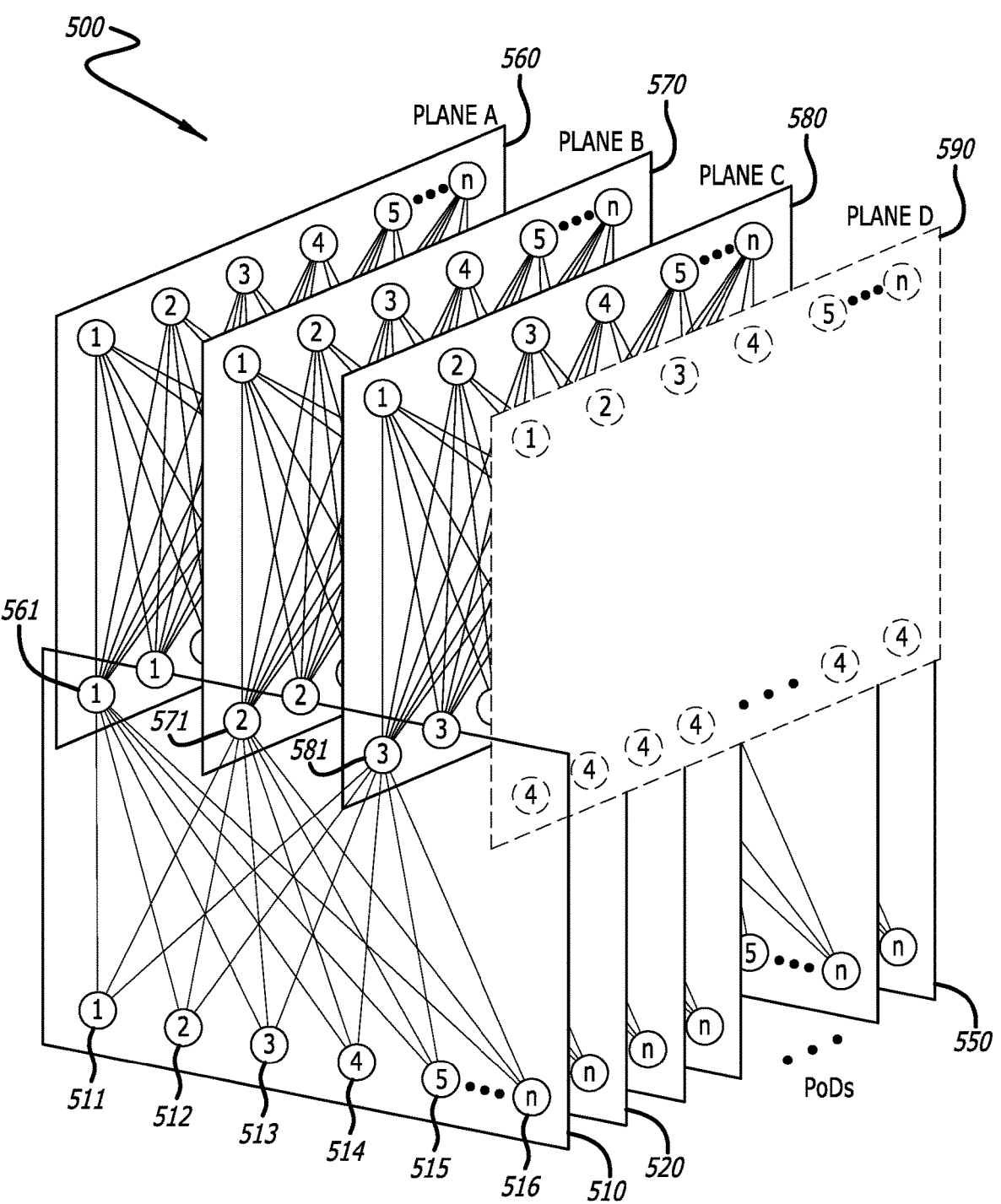
FIG. 5 is a conceptual schematic diagram of a plane and pod network architecture with one de-energized plane in accordance with various embodiments of the disclosure.

Referring to FIG. 5, a conceptual schematic diagram of a plane and pod network architecture 500 with one de-energized plane in accordance with various embodiments of the disclosure is shown. As will be described in more detail below, various situations may occur that can indicate that one or more planes can be de-energized in order to save energy or otherwise be in a more sustainable configuration.

Specifically, in the embodiment depicted in FIG. 5, plane D 590 has been depowered and no PoDs are connected as well. In more embodiments, the series of PoDs will operate as if they have one less connection. Again, in the embodiment depicted in FIG. 5, each POD operates with only three connections, while the fourth connection is now not available. As described below, some embodiments can stop traffic being forwarded or otherwise directed to the plane to be de-energized. After an acknowledgement or a sufficient period of time has elapsed, the plane can be in a state where no traffic is within the plane. At this point, the plane can be de-energized or put in a lower-power mode.

This determination can be based on a number of factors such as current traffic conditions or expected traffic patterns. In some embodiments, a network administrator can de-energize a plane. However, the network administrator may be a cloud-based network administration suite or could be a control plane that is tasked with overseeing a plurality of planes within a network to potentially de-energize. The determination to de-energize can be done based on a heuristic system or may occur in response to one or more machine learning processes. Specific processes for making these decisions are described in more detail below.

Although specific embodiments for a plane and pod network architecture suitable for carrying out the various steps, processes, methods, and operations described herein is discussed with respect to FIGS. 4-5, any of a variety of systems and/or processes may be utilized in accordance with embodiments of the disclosure. For example, the plane and pod system depicted in FIGS. 4 and 5 are exemplary and simplified for ease of understanding. However, those skilled in the art will recognize that any type of plane and pod configuration that is desired for a specific application. The elements depicted in FIGS. 4-5 may also be interchangeable with other elements of FIGS. 1-3 and 6-11 as required to realize a particularly desired embodiment.

Figure 6:
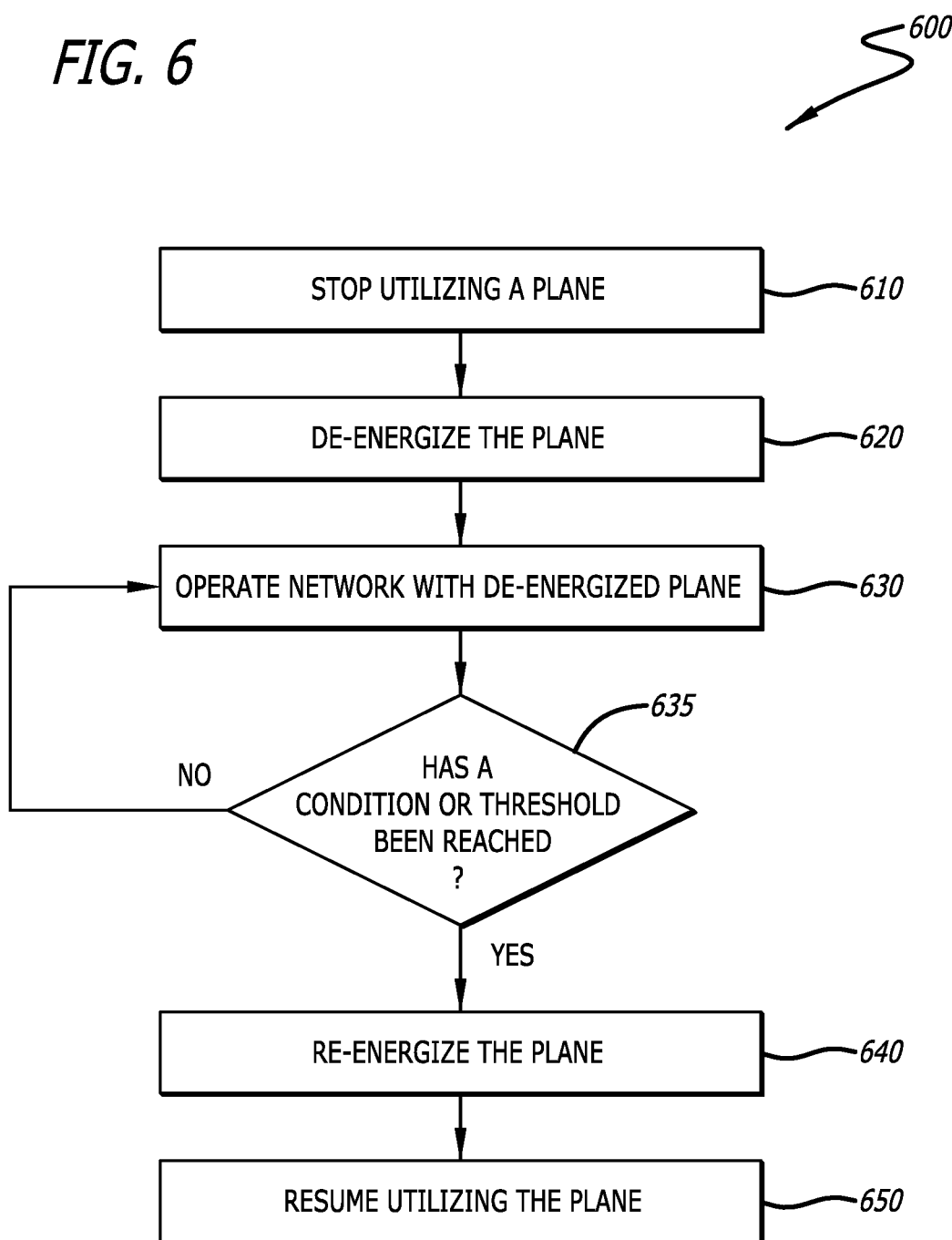
FIG. 6 is a flowchart depicting a process for de-energizing a plane in accordance with various embodiments of the disclosure.

Referring to FIG. 6, a flowchart depicting a process 600 for de-energizing a plane in accordance with various embodiments of the disclosure is shown. In many embodiments, the process 600 can stop utilizing a plane (block 610). As described below, there are multiple ways to stop utilizing the plane which can include sending signals explicitly requesting that the plane not be utilized anymore, but can also include other methods such as changing one or more protocols or indicating that the plane is not operating correctly, etc. In various embodiments, one or more evaluations or determinations can occur prior to stopping the plane from being utilized.

In more embodiments, the process 600 can de-energize the plane (block 620). Often, this can be done upon an acknowledgement signal being received indicating that the plane is ready for de-energized. In some embodiments, the plane can be fully turned off when de-energized, but may also be set to a lower-power mode in order to wake upon reception of a signal.

In additional embodiments, the process 600 can operate the network with the de-energized plane (block 630). These embodiments can often cover networks that have a centralized network administrator or software network administration suite. However, some embodiments may de-energize the plane without overseeing the operation of the network directly. In these embodiments, the device, control plane, or other system can wait for one or more conditions to occur.

In further embodiments, the process 600 can determine if a condition has occurred or if a threshold has been reached (block 635). In response to no condition or event occurring, the process 600 can again continue to operate the network with the de-energized plane (block 630). However, when a condition or threshold is reached or otherwise detected, the process 600 can re-energize the plane (block 640). The condition or threshold can include monitoring the network traffic or having a prediction indicating an increase in traffic that is likely to come in the future. Re-energizing the plane can be done by a signal indicating the plane to wake or by resupplying power.

In a number of embodiments, the process 600 can resume utilizing the plane (block 650). The plane may send a signal indicating that it is ready to receive more traffic. However, in some embodiments, the plane may be utilized after a certain period of time needed for boot up. In more embodiments, any protocol adjustments or other signals indicating the plane was not suitable for use may be cancelled, modified, or otherwise adjusted to allow for traffic to flow to the re-energized plane.

Although a specific embodiment for de-energizing a plane suitable for carrying out the various steps, processes, methods, and operations described herein is discussed with respect to FIG. 6, any of a variety of systems and/or processes may be utilized in accordance with embodiments of the disclosure. For example, the process 600 may occur in a short period of time or may be carried out during certain times of day per direction from a profile configuration or other network administrator input. The elements depicted in FIG. 6 may also be interchangeable with other elements of FIGS. 1-5 and 7-11 as required to realize a particularly desired embodiment.

Referring to FIG. 7, a flowchart depicting a process 700 for de-energizing a plane via leaf commands in accordance with various embodiments of the disclosure is shown. In many embodiments, the process 700 can examine a plane on the network (block 710). The examination can be done by looking at current traffic patterns. However, one or more machine learning processes or historical data can be utilized to generate predictive analysis on upcoming traffic patterns.

Based on this, the process 700 can in various embodiments, determine if the plane being examined can be de-energized (block 715). If it is determined that the plane should not currently be de-energized, the process 700 can continue to examine another plane on the network (block 710). However, when it is determined that the plane can be de-energized, various embodiments of the process 700 can send a command to the leaves associated with the plane to stop utilizing the plane (block 720). As seen above with respect to FIGS. 4 and 5, each plane is connected to a series of leaves. Each of the leaves associated or otherwise connected to the plane can receive a signal that indicates that traffic should not be forwarded to the plane any longer.

In further embodiments, the process 700 can wait to receive acknowledgement responses from the leaves (block 730). The acknowledgement can be received in certain embodiments as a direct "ACK" signal directly from the leaves. However, in more embodiments, the acknowledgement may be inferred through one or more monitored actions the leaves can take. Eventually, various embodiments of process 700 can determine if acknowledgements have been received from all leaves (block 735). If it is determined that all leaves have acknowledged the command, then the process 700 can continue to wait (block 730). However, if all of the leaves have acknowledged the command, then more embodiments of the process 700 can de-energize the plane (block 740). De-energization can include powering down or entering a lower-power mode. The exact de-energization can be configured and directed by a network administrator or be based on one or more power profiles.

In some embodiments, the process can operate the network with the de-energized plane (block 750). In these embodiments, a network administrator, network monitoring device, or other networking administration software can operate the network as needed. However, in certain embodiments, the process 700 may not directly operate a network but simply monitor network conditions. As a result, still further embodiments of process 700 can determine if a triggering event has occurred (block 755). When a triggering event has not occurred, the process 700 can continue to operate the network with the de-energized plane (block 750).

However, when a triggering event has occurred, various embodiments of process 700 can re-energize the plane (block 760). A triggering event may be a threshold that has been exceeded or may be a certain network condition that has occurred or is predicted to occur. Re-energizing the plane can be done in some embodiments by sending a wake signal to the plane. However, certain embodiments may simply re-establish power to the plane.

In some optional embodiments, the process 700 can verify that the plane has been re-energized (block 770). This can be from a direct signal either requested or received from the re-energized plane. However, in certain embodiments, the process 700 may simply wait a predetermined amount of time that is known for the plane to re-energize or otherwise reboot back to operation.

In more embodiments, the process 700 can send a command to the leaves associated with the plane to start utilizing the plane again (block 780). This command may be issued individually to each leaf or may be configured to be sent to one leaf in a manner that will be cascaded or otherwise passed on to the remaining leaves. In response, the leaves may begin to send traffic to the re-energized plane again.

Although a specific embodiment for a process to de-energize a plane via leaf commands suitable for carrying out the various steps, processes, methods, and operations described herein is discussed with respect to FIG. 7, any of a variety of systems and/or processes may be utilized in accordance with embodiments of the disclosure. For example, the process 700 may be carried out remotely from a network administration software suite or may be facilitated by a device attached to the network or the planes themselves. The elements depicted in FIG. 7 may also be interchangeable with other elements of FIGS. 1-6 and 8-11 as required to realize a particularly desired embodiment.

Referring to FIG. 8, a flowchart depicting a process 800 for de-energizing a plane via load balancing protocol adjustments in accordance with various embodiments of the disclosure is shown. Similar to the embodiment depicted in FIG. 7, many embodiments of the process 700 can examine a plane on the network (block 810). The examination can be done by looking at current traffic patterns. However, one or more machine learning processes or historical data can be utilized to generate predictive analysis on upcoming traffic patterns.

Based on this, the process 800 can in various embodiments, determine if the plane being examined can be de-energized (block 815). If it is determined that the plane should not currently be de-energized, the process 800 can continue to examine another plane on the network (block 810). However, when it is determined that the plane can be de-energized, various embodiments of the process 800 can adjust a load balancing protocol such that the leaves will not send traffic to the examined plane (block 820).

As seen above with respect to FIGS. 4 and 5, each plane is connected to a series of leaves. Each of the leaves associated or otherwise connected to the plane typically operate under one or more load balancing protocols. As those skilled in the art will recognize, load balancing protocols are typically utilized to distribute network traffic across multiple servers, ensuring scalability, high availability, and optimal resource utilization. This can allow for increased performance, fault tolerances, and flexible network traffic management. The adjustment to the load balancing protocol may include, but is not limited to, manipulating, or otherwise changing one or more routing metrics associated with the spine in such a way that utilizing the plane becomes undesired and/or sub-optimal. This can be done by increasing the link cost, or available bandwidth, etc.

In further optional embodiments, the process 800 can wait to receive acknowledgement responses on the updated protocol adjustments (block 830). The acknowledgement can be received in certain embodiments as a direct "ACK" signal. However, in more embodiments, the acknowledgement may be inferred through a series of monitoring, testing, and/or analysis. In a number of embodiments, after a predetermined amount of time has passed, or the updated protocols have been verified, then more embodiments of the process 800 can de-energize the plane (block 840). De-energization can include powering down or entering a lower-power mode. The exact de-energization can be configured and directed by a network administrator or be based on one or more power profiles.

In some embodiments, the process can operate the network with the de-energized plane (block 850). In these embodiments, a network administrator, network monitoring device, or other networking administration software can operate the network as needed. However, in certain embodiments, the process 800 may not directly operate a network but simply monitor network conditions. As a result, still further embodiments of process 800 can determine if a triggering event has occurred (block 855). When a triggering event has not occurred, the process 800 can continue to operate the network with the de-energized plane (block 850).

However, when a triggering event has occurred, various embodiments of process 800 can re-energize the plane (block 860). A triggering event may be a threshold that has been exceeded or may be a certain network condition that has occurred or is predicted to occur. Re-energizing the plane can be done in some embodiments by sending a wake signal to the plane. However, certain embodiments may simply re-establish power to the plane.

In some optional embodiments, the process 800 can verify that the plane has been re-energized (block 870). This can be from a direct signal either requested or received from the re-energized plane. However, in certain embodiments, the process 800 may simply wait a predetermined amount of time that is known for the plane to re-energize or otherwise reboot back to operation.

In more embodiments, the process 800 can adjust the load balancing protocol such that the leaves will once again send traffic to the re-energized plane (block 880). This adjustment may be issued individually to each leaf or may be global in nature. The adjustment may be directed to the spine directly or can be configured to be sent to one spine in a plurality of spines in a manner that will be cascaded or otherwise passed on to the remaining spines. In response, the leaves may begin to send traffic to the re-energized plane again.

Although a specific embodiment for de-energizing a plane via load balancing protocol adjustments suitable for carrying out the various steps, processes, methods, and operations described herein is discussed with respect to FIG. 8, any of a variety of systems and/or processes may be utilized in accordance with embodiments of the disclosure. For example, the load balancing protocol adjustments can be selected as an optimal method of de-energizing the spine as a result of one or more tests or evaluations on the local network. The elements depicted in FIG. 8 may also be interchangeable with other elements of FIGS. 1-7 and 9-11 as required to realize a particularly desired embodiment.

Figure 9:
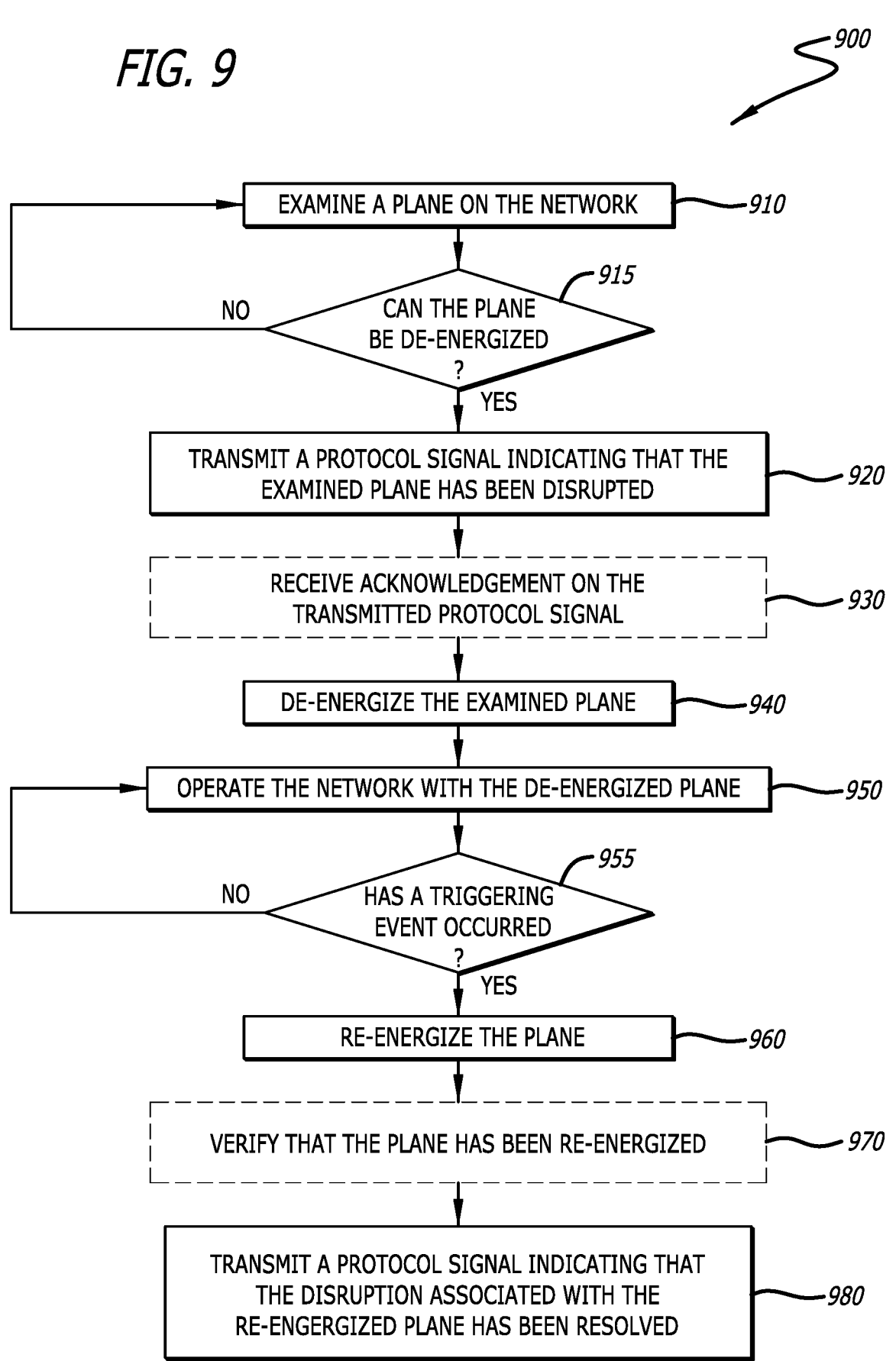
FIG. 9 is a flowchart depicting a process for de-energizing a plane via disruption protocol signals in accordance with various embodiments of the disclosure.

Referring to FIG. 9, a flowchart depicting a process 900 for de-energizing a plane via disruption protocol signals in accordance with various embodiments of the disclosure is shown. Similar to the embodiments depicted in FIGS. 7 and 8, many embodiments of the process 900 can examine a plane on the network (block 910). The examination can be done by looking at current traffic patterns. However, one or more machine learning processes or historical data can be utilized to generate predictive analysis on upcoming traffic patterns.

Based on this, the process 900 can in various embodiments, determine if the plane being examined can be de-energized (block 915). If it is determined that the plane should not currently be de-energized, the process 900 can continue to examine another plane on the network (block 910). However, when it is determined that the plane can be de-energized, various embodiments of the process 900 can transmit a protocol signal indicating that the examined plane has been disrupted (block 920).

As seen above with respect to FIGS. 4 and 5, each plane is connected to a series of leaves. Each of the leaves associated or otherwise connected to the plane typically operate under one or more protocols, such as load balancing protocols described above. However, as those skilled in the art will recognize, other protocols may exist that can allow for indicating if a network device, such as a plane is currently disrupted. These protocols may include, but are not limited to, Internet Control Message Protocol (ICMP), Address Resolution Protocol (ARP), Simple Network Management Protocol (SNMP), Spanning Tree Protocol (STP), Link Layer Discover Protocol (LLDP), and other routing protocols such as Open Shortest Path First (OSPF), Border Gateway Protocol (BGP) and the like.

In further optional embodiments, the process 900 can wait to receive acknowledgement responses on the transmitted protocol signal(s) (block 930). The acknowledgement can be received in certain embodiments as a direct "ACK" signal. However, in more embodiments, the acknowledgement may be inferred through a series of monitoring, testing, and/or analysis. In a number of embodiments, after a predetermined amount of time has passed, or the desired lack of traffic going to the examined spine has been verified, then some embodiments of the process 900 can de-energize the plane (block 940). De-energization can include powering down or entering a lower-power mode. The exact de-energization can be configured and directed by a network administrator or be based on one or more power profiles.

In some embodiments, the process can operate the network with the de-energized plane (block 950). In these embodiments, a network administrator, network monitoring device, or other networking administration software can operate the network as needed. However, in certain embodiments, the process 900 may not directly operate a network but simply monitor network conditions. As a result, still further embodiments of process 900 can determine if a triggering event has occurred (block 955). When a triggering event has not occurred, the process 900 can continue to operate the network with the de-energized plane (block 950).

However, when a triggering event has occurred, various embodiments of process 900 can re-energize the plane (block 960). A triggering event may be a threshold that has been exceeded or may be a certain network condition that has occurred or is predicted to occur. Re-energizing the plane can be done in some embodiments by sending a wake signal to the plane. However, certain embodiments may simply re-establish power to the plane.

In some optional embodiments, the process 900 can verify that the plane has been re-energized (block 970). This can be from a direct signal either requested or received from the re-energized plane. However, in certain embodiments, the process 900 may simply wait a predetermined amount of time that is known for the plane to re-energize or otherwise reboot back to operation.

In more embodiments, the process 900 can transmit a protocol signal indicating that the disruption associated with the re-energized plane has been resolved (block 980). This transmission may be issued individually to each leaf or may be global in nature. The transmission may be directed to the spine directly or can be configured to be sent to one spine in a plurality of spines in a manner that will be cascaded or otherwise passed on to the remaining spines. In response to the various embodiments described herein, the leaves may begin to send traffic to the re-energized plane again.

Although a specific embodiment for de-energizing a plane via disruption protocol signals suitable for carrying out the various steps, processes, methods, and operations described herein is discussed with respect to FIG. 9, any of a variety of systems and/or processes may be utilized in accordance with embodiments of the disclosure. For example, the disruption signal may be of a nature to indicate that a network traffic jam is occurring or may indicate that the spine is currently experiences errors, technical difficulties, or is otherwise removed from the network. The elements depicted in FIG. 9 may also be interchangeable with other elements of FIGS. 1-8 and 10-11 as required to realize a particularly desired embodiment.

Figure 10:
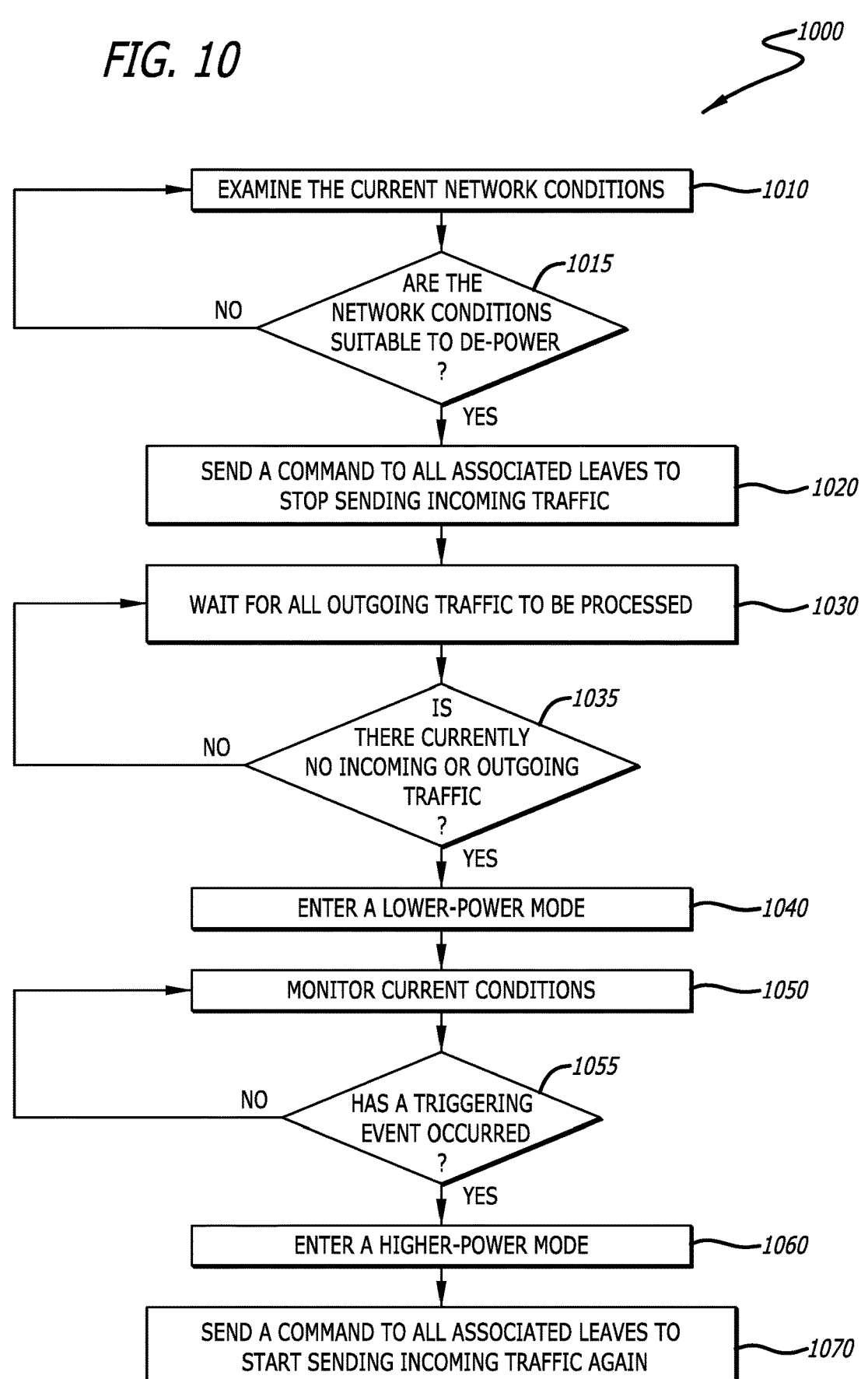
FIG. 10 is a flowchart depicting a process for a de-energizing a plane via a control plane in accordance with various embodiments of the disclosure.

Referring to FIG. 10, a flowchart depicting a process for a de-energizing a plane via a control plane in accordance with various embodiments of the disclosure is shown. In many embodiments, the process 1000 can examine the current network conditions (block 1010). In certain embodiments, the control plane can have access to network data associated with external network devices such as the other planes in a plurality of planes. However, in some embodiments, the control plane may examine data associated only with the control plane and make decisions and/or extrapolations to the other spines in the plurality of spines.

Based on the examined network conditions, various embodiments of the process can determine if it is suitable to de-power (de-energize) one or more spines in the plurality of spines (block 1015). Often, this can be an evaluation on if the control plane is capable of being de-energized. When the determination is that it is not currently suitable to de-energize a plane, the process 1000 can continue to examine the current network conditions (block 1010).

However, when it is determined that it is suitable to de-energize a plane, the process 1000 can send a command to all associated leaves to stop incoming traffic (block 1020). In certain embodiments, this can be all of the leaves associated with the control plane, but may be leaves associated with a different plane in the plurality of plane that the control plane is attempting to de-energize. The command can be a direct command, but as seen above with respect to FIGS. 8 and 9, may also be a signal related to a protocol that can make it unappealing or non-optimal to send network traffic to the plane to be de-energized.

In a number of embodiments, the process 1000 can wait for all outgoing traffic to be processed (block 1030). When the control plane is being de-energized, it can evaluate itself to determine if all traffic has been processed and passed on. In some embodiments though, the control plane is directing a different plane to de-energize and can either direct a signal to verify that all outgoing traffic has been processed or may wait a predetermined amount of time known to allow for all traffic to be processed for that particular plane.

Subsequently, numerous embodiments of the process 1000 can determine if there is currently no incoming and outgoing traffic associated with the plane to be de-energized (block 1035). If it is determined that there is still incoming or outgoing traffic, then additional embodiments of the process 1000 can continue to wait for the outgoing (or incoming) traffic to be processed (block 1030). However, when it is determined that all incoming and outgoing traffic has been processed, the process 1000 can enter a low-power mode (block 1040). In some embodiments, the low-power mode can be a sleep mode. In more embodiments, the low-power mode may be a full de-energizing and removal of all power. In various embodiments, the control plane may de-energize itself. In additional embodiments, the process 1000 is a control plane that directs another plane in the plurality of planes to de-energize or otherwise enter a lower-power mode.

In some embodiments, the process can subsequently monitor the current network conditions (block 1050). The monitoring can be done by the control plane itself or be part of a software-based network administration suite. As a result, still further embodiments of process 1000 can determine if a triggering event has occurred (block 1055). When a triggering event has not occurred, the process 1000 can continue to monitor the current conditions (block 1050).

However, when it is determined that a triggering event has occurred, the process 1000 can direct the de-energized plane to enter a higher-power mode (block 1060). In certain embodiments, this can be directing the plane to power back to the previous operational levels prior to the de-energization. In some embodiments, the higher-power mode may be to process certain traffic and not equate to previous operational levels.

In numerous embodiments, the process 1000 can send a command to all associated leaves to start sending incoming traffic again to the re-energized plane (block 1070). This command may be issued individually to each leaf or may be global in nature. The command may be directed to the spine directly or can be configured to be sent to one spine in a plurality of spines in a manner that will be cascaded or otherwise passed on to the remaining spines. In response to the various embodiments described herein, the leaves may begin to send traffic to the re-energized plane again.

Although a specific embodiment for de-energizing a plane via a control plane suitable for carrying out the various steps, processes, methods, and operations described herein is discussed with respect to FIG. 10, any of a variety of systems and/or processes may be utilized in accordance with embodiments of the disclosure. For example, the control plane may be remote or otherwise associated with a different plurality of planes. The elements depicted in FIG. 10 may also be interchangeable with other elements of FIGS. 1-9 and 11 as required to realize a particularly desired embodiment.

Figure 11:
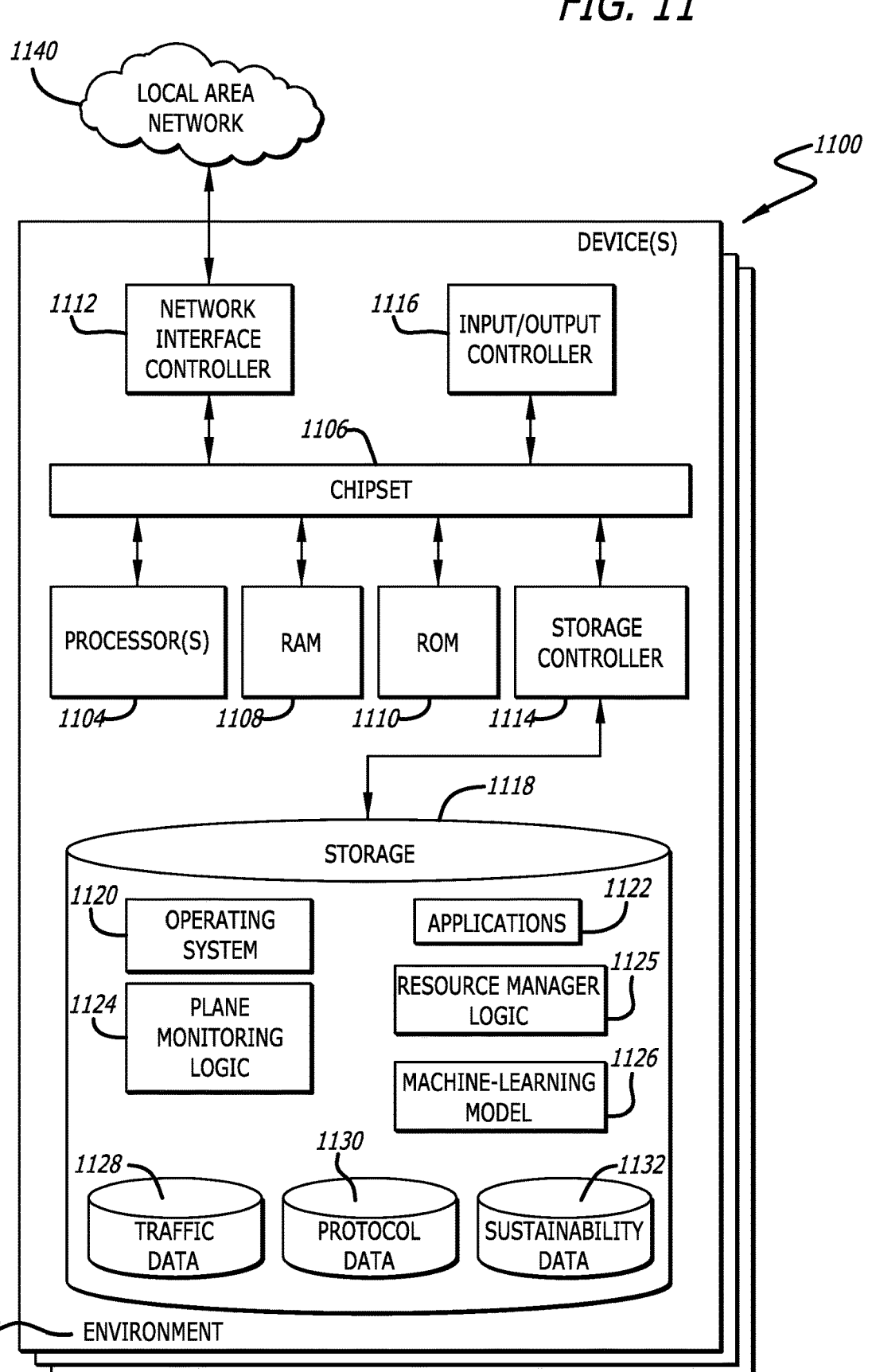
FIG. 11 is a conceptual block diagram of a device suitable for use in a plane de-energizing system in accordance with various embodiments of the disclosure.

Referring to FIG. 11, a conceptual block diagram of a device suitable for use in a plane de-energizing system in accordance with various embodiments of the disclosure is shown. The embodiment of the conceptual block diagram depicted in FIG. 11 can illustrate a conventional server computer, workstation, desktop computer, laptop, tablet, network appliance, e-reader, smartphone, or other computing device, and can be utilized to execute any of the application and/or logic components presented herein. The device 1100 may, in some examples, correspond to physical devices or to virtual resources described herein.

In many embodiments, the device 1100 may include an environment 1102 such as a baseboard or "motherboard," in physical embodiments that can be configured as a printed circuit board with a multitude of components or devices connected by way of a system bus or other electrical communication paths. Conceptually, in virtualized embodiments, the environment 1102 may be a virtual environment that encompasses and executes the remaining components and resources of the device 1100. In more embodiments, one or more processors 1104, such as, but not limited to, central processing units ("CPUs") can be configured to operate in conjunction with a chipset 1106. The processor(s) 1104 can be standard programmable CPUs that perform arithmetic and logical operations necessary for the operation of the device 1100.

In additional embodiments, the processor(s) 1104 can perform one or more operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

In certain embodiments, the chipset 1106 may provide an interface between the processor(s) 1104 and the remainder of the components and devices within the environment 1102. The chipset 1106 can provide an interface to a random-access memory ("RAM") 1108, which can be used as the main memory in the device 1100 in some embodiments. The chipset 1106 can further be configured to provide an interface to a computer-readable storage medium such as a read-only memory ("ROM") 1110 or non-volatile RAM ("NVRAM") for storing basic routines that can help with various tasks such as, but not limited to, starting up the device 1100 and/or transferring information between the various components and devices. The ROM 1110 or NVRAM can also store other application components necessary for the operation of the device 1100 in accordance with various embodiments described herein.

Different embodiments of the device 1100 can be configured to operate in a networked environment using logical connections to remote computing devices and computer systems through a network, such as the network 1140. The chipset 1106 can include functionality for providing network connectivity through a network interface card ("NIC") 1112, which may comprise a gigabit Ethernet adapter or similar component. The NIC 1112 can be capable of connecting the device 1100 to other devices over the network 1140. It is contemplated that multiple NICs 1112 may be present in the device 1100, connecting the device to other types of networks and remote systems.

In further embodiments, the device 1100 can be connected to a storage 1118 that provides non-volatile storage for data accessible by the device 1100. The storage 1118 can, for example, store an operating system 1120, applications 1122, and data 1128, 1130, 1132, which are described in greater detail below. The storage 1118 can be connected to the environment 1102 through a storage controller 1114 connected to the chipset 1106. In certain embodiments, the storage 1118 can consist of one or more physical storage units. The storage controller 1114 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The device 1100 can store data within the storage 1118 by transforming the physical state of the physical storage units to reflect the information being stored. The specific transformation of physical state can depend on various factors. Examples of such factors can include, but are not limited to, the technology used to implement the physical storage units, whether the storage 1118 is characterized as primary or secondary storage, and the like.

For example, the device 1100 can store information within the storage 1118 by issuing instructions through the storage controller 1114 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit, or the like. Other transformations of physical media are possible without departing from the scope and spirit of the present description, with the foregoing examples provided only to facilitate this description. The device 1100 can further read or access information from the storage 1118 by detecting the physical states or characteristics of one or more particular locations within the physical storage units.

In addition to the storage 1118 described above, the device 1100 can have access to other computer-readable storage media to store and retrieve information, such as program modules, data structures, or other data. It should be appreciated by those skilled in the art that computer-readable storage media is any available media that provides for the non-transitory storage of data and that can be accessed by the device 1100. In some examples, the operations performed by a cloud computing network, and or any components included therein, may be supported by one or more devices similar to device 1100. Stated otherwise, some or all of the operations performed by the cloud computing network, and or any components included therein, may be performed by one or more devices 1100 operating in a cloud-based arrangement.

By way of example, and not limitation, computer-readable storage media can include volatile and non-volatile, removable, and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage 1118 can store an operating system 1120 utilized to control the operation of the device 1100. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage 1118 can store other system or application programs and data utilized by the device 1100.

In various embodiment, the storage 1118 or other computer-readable storage media is encoded with computer-executable instructions which, when loaded into the device 1100, may transform it from a general-purpose computing system into a special-purpose computer capable of implementing the embodiments described herein. These computer-executable instructions may be stored as application 1122 and transform the device 1100 by specifying how the processor(s) 1104 can transition between states, as described above. In some embodiments, the device 1100 has access to computer-readable storage media storing computer-executable instructions which, when executed by the device 1100, perform the various processes described above with regard to FIGS. 1-10. In more embodiments, the device 1100 can also include computer-readable storage media having instructions stored thereupon for performing any of the other computer-implemented operations described herein.

In still further embodiments, the device 1100 can also include one or more input/output controllers 1116 for receiving and processing input from a number of input devices, such as a keyboard, a mouse, a touchpad, a touch screen, an electronic stylus, or other type of input device. Similarly, an input/output controller 1116 can be configured to provide output to a display, such as a computer monitor, a flat panel display, a digital projector, a printer, or other type of output device. Those skilled in the art will recognize that the device 1100 might not include all of the components shown in FIG. 11, and can include other components that are not explicitly shown in FIG. 11, or might utilize an architecture completely different than that shown in FIG. 11.

As described above, the device 1100 may support a virtualization layer, such as one or more virtual resources executing on the device 1100. In some examples, the virtualization layer may be supported by a hypervisor that provides one or more virtual machines running on the device 1100 to perform functions described herein. The virtualization layer may generally support a virtual resource that performs at least a portion of the techniques described herein.

In many embodiments, the device 1100 can include a plane monitoring logic 1124 that can be configured to perform one or more of the various steps, processes, operations, and/or other methods that are described above. Often, the plane monitoring logic 1124 can be a set of instructions stored within a non-volatile memory that, when executed by the processor(s)/controller(s) 1104 can carry out these steps, etc. In some embodiments, the plane monitoring logic 1124 may be a client application that resides on a network-connected device, such as, but not limited to, a server, switch, personal or mobile computing device. In certain embodiments, the plane monitoring logic 1124 can direct the de-energization of one or more planes based on receiving an updated sustainable configuration from a machine-learning model 1126.

However, in additional embodiments, the plane monitoring logic 1124 can generate various scores and metrics with data provided by external sources. In further embodiments, the plane monitoring logic 1124 may also generate or otherwise facilitate the creation of proposed sustainable configurations for evaluation. In still more embodiments, the plane monitoring logic 1124 can evaluate a proposed sustainable configuration based on the one or more scores and data sources available. Finally, in certain embodiments, the plane monitoring logic 1124 can select and apply an updated sustainable configuration to the network by directing one or more planes to de-energize and/or re-energize.

In a number of embodiments, the storage 1118 can include traffic data 1128. In many embodiments, traffic data can include data relating to the amount of traffic passing through one or more network devices. For example, each plane may have a certain amount of traffic passing through it over a given period of time. The traffic data 1128 can be utilized to track this and make decisions on whether a plane should be de-energized, etc. In more embodiments, the traffic data 1128 can be configured to store historical data such that predictions of future traffic may be determined.

In various embodiments, the storage 1118 can include protocol data 1130. As discussed above, various embodiments described herein may prepare to de-energize a plane by modifying one or more protocols and/or transmitting a protocol signal. These various protocol signals and their format to allow for plane de-energization can be stored as protocol data 1130. In additional embodiments, the protocol data 1130 can be updated as new protocols are added and/or better protocol signals are determined that can have similar to more efficient effects allowing for plane de-energization.

In still more embodiments, the storage 1118 can include sustainability data 1132. As described above in the discussion of FIG. 1, sustainability data can include sustainability attributes of various devices, elements, and other components of a virtual meeting network. The sustainability data 1132 may comprise both capability data related to various devices but can also include the power source type associated with each device within a network proposed or being utilized for resource processing. In some embodiments, the sustainability data 1132 can include historical records such that decisions or inferences can be generated without all current real-time data, or to make a prediction of upcoming network conditions.

In additional embodiments, the sustainability data 1132 can include various metrics as described above, such as, but not limited to, a plane efficiency metric, a $CO_2$ efficiency metric, a real-time power efficiency metric, a network energy cost metric, and/or a network efficiency metric. Those skilled in the art will recognize that other sustainability-related metrics are possible for calculations based off of the available infrastructure data, traffic data, protocol data, plane data, and other third-party data sources. Any variety of sustainability data 1132 may be utilized or formatted for use within various embodiments described herein to realize the desired application.

Finally, in many embodiments, data may be processed into a format usable by a machine-learning model 1126 (e.g., feature vectors), and or other pre-processing techniques. The machine-learning ("ML") model 1126 may be any type of ML model, such as supervised models, reinforcement models, and/or unsupervised models. The ML model 1126 may include one or more of linear regression models, logistic regression models, decision trees, Naïve Bayes models, neural networks, k-means cluster models, random forest models, and/or other types of ML models 1126. The ML model 1126 may be configured to learn the pattern of the traffic flow between devices and generate prediction as to when it would be suitable to de-energize a plane and/or to re-energize a de-energized plane.

The ML model(s) 1126 can be configured to generate inferences to make predictions or draw conclusions from data. An inference can be considered the output of a process of applying a model to new data. This can occur by learning from infrastructure data, sustainability data, and/or health data and use that learning to predict future outcomes. These predictions are based on patterns and relationships discovered within the data. To generate an inference, the trained model can take input data and produce a prediction or a decision. The input data can be in various forms, such as images, audio, text, or numerical data, depending on the type of problem the model was trained to solve. The output of the model can also vary depending on the problem, and can be a single number, a probability distribution, a set of labels, a decision about an action to take, etc. Ground truth for the ML model(s) 1126 may be generated by human/administrator verifications or may compare predicted outcomes with actual outcomes.

The ML model(s) 1126 may be configured to predict the usage and/or configurations of a better sustainability-optimized distribution of resources. Likewise, the ML model(s) 1126 may be configured in certain embodiments to predict upcoming events that may affect the sustainability of allocated resources. In many embodiments, the ML model(s) 1126 can be utilized to efficiently generate proposed sustainability configurations that can be evaluated for a plurality of planes. Proposed configurations generated by the ML model(s) 1126 may, for instance, narrow down the de-energization options based on past data and upcoming events to focus the variations of configuration combinations needed for evaluation. In this way, updated sustainable configurations may be generated at a faster rate than simple heuristic or random resource allocation choices.

Although a specific embodiment for a device suitable for use in a plane de-energizing system suitable for carrying out the various steps, processes, methods, and operations described herein is discussed with respect to FIG. 11, any of a variety of systems and/or processes may be utilized in accordance with embodiments of the disclosure. For example, the device may be a control plane, a network device, a network administration control suite, or even remotely based such as via a cloud-based service. The elements depicted in FIG. 11 may also be interchangeable with other elements of FIGS. 1-10 as required to realize a particularly desired embodiment.

Information Although the present disclosure has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present disclosure can be practiced other than specifically described without departing from the scope and spirit of the present disclosure. Thus, embodiments of the present disclosure should be considered in all respects as illustrative and not restrictive. It will be evident to the person skilled in the art to freely combine several or all of the embodiments discussed here as deemed suitable for a specific application of the disclosure. Throughout this disclosure, terms like "advantageous", "exemplary" or "example" indicate elements or dimensions which are particularly suitable (but not essential) to the disclosure or an embodiment thereof and may be modified wherever deemed suitable by the skilled person, except where expressly required. Accordingly, the scope of the disclosure should be determined not by the embodiments illustrated, but by the appended claims and their equivalents.

Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, workpiece, and fabrication material detail can be made, without departing from the spirit and scope of the present disclosure, as set forth in the appended claims, as might be apparent to those of ordinary skill in the art, are also encompassed by the present disclosure.

What is claimed is:

1. A device, comprising:
   a processor;
   a memory communicatively coupled to the processor;
   a communication port coupled with a second device within a network comprising two or more planes wherein each plane is connected to a plurality of pods through one or more spine connections; and a plane monitoring logic configured to:

examine at least one of the two or more planes;

select at least one plane to de-energize;

stop utilizing the selected at least one plane by adjusting a load balancing protocol such that leaves associated with the plurality of pods connected to the at least one plane stop sending traffic to the at least one plane;

de-energize the at least one plane;

operate the network with the de-energized at least one plane;

monitor a plurality of values on the network against at least one threshold value;

re-energize, in response to the at least one threshold value being exceeded, the at least one plane; and resume utilizing the at least one plane.

2. The device of claim 1, wherein selecting the at least one plane to be de-energized can be based on one or more network values.

3. The device of claim 2, wherein the plane monitoring logic is further configured to monitor the one or more network values prior to selecting the at least one plane to de-energize.

4. The device of claim 3, wherein, prior to selecting the at least one plane to de-energize, the plane monitoring logic is further configured to monitor a threshold value and the selecting of the at least one plane to de-energize is in response to the threshold value being exceeded.

5. The device of claim 4, wherein the threshold is compared against the one or more network values.

6. The device of claim 5, wherein the one or more network values are associated with current network traffic levels.

7. The device of claim 5, wherein the one or more network values are associated with predicted network traffic levels.

8. The device of claim 1, wherein the plane monitoring logic is configured to stop utilizing the selected at least one plane by sending a command to a plurality of leaves associated with the plurality of pods connected to the at least one plane to stop utilizing the at least one plane.

9. The device of claim 1, wherein the plane monitoring logic is further configured to receive an acknowledgement from the plurality of leaves associated with the plurality of pods prior to de-energizing the at least one plane.

10. The device of claim 1, wherein the plane monitoring logic is further configured to receive an acknowledgement associated with the adjusted load balancing protocol adjustments prior to de-energizing the at least one plane.

11. The device of claim 10, wherein the plane monitoring logic is configured to stop utilizing the selected at least one plane by transmitting a protocol signal that the at least one plane has been disrupted such that the plurality of leaves associated with the plurality of pods connected to the at least one plane to stop sending traffic to the at least one plane.

12. The device of claim 11, wherein the plane monitoring logic is further configured to receive an acknowledgement associated with the transmitted protocol signal prior to de-energizing the at least one plane.

13. The device of claim 1, wherein the plane monitoring logic is further configured to verify that the at least one plane has been re-energized prior to resuming utilizing the at least one plane.

14. A control plane, comprising:

a processor;

a memory communicatively coupled to the processor;

a communication port coupled with at least one other plane within a network wherein each of the planes is connected to a plurality of pods through one or more spine connections; and a plane monitoring logic configured to:

examine the at least one other plane;

select at least one plane to de-energize;

stop utilizing the selected at least one plane by adjusting a load balancing protocol such that leaves associated with the plurality of pods connected to the at least one plane stop sending traffic to the at least one plane;

de-energize the at least one plane;

monitor the network for at least one triggering event;

re-energize, in response to the at least one triggering event, the at least one plane; and resume utilizing the at least one plane.

15. The control plane of claim 14, wherein the plane monitoring logic is further configured to verify that the at least one plane has been re-energized prior to resuming utilizing the at least one plane.

16. A method of de-energizing a plane in a network comprising a plurality of planes, the method comprising:

examining at least one of the plurality of planes;

selecting at least one plane to de-energize;

stopping utilizing the selected at least one plane by adjusting a load balancing protocol such that leaves associated with the plurality of pods connected to the at least one plane stop sending traffic to the at least one plane;

de-energizing the at least one plane;

monitoring a plurality of values on the network against at least one threshold value;

re-energizing, in response to the at least one threshold value being exceeded, the at least one plane; and resuming utilizing the at least one plane.

17. The method of claim 16, wherein the method further comprises examining the at least one plane prior to selecting at least one plane to de-energize.

18. The method of claim 17, wherein the method further comprises verifying that the at least one plane has been re-energized prior to resuming utilizing the at least one plane.

*    *    *    *    *